(12) United States Patent
Kim-E

(10) Patent No.: US 7,165,045 B1
(45) Date of Patent: Jan. 16, 2007

(54) NETWORK-BASED TRADING SYSTEM AND METHOD

(76) Inventor: Miral Kim-E, 1639 Shippon Ave., Stamford, CT (US) 06902-8101

( * ) Notice: Subject to any disclaimer, the term of this patent is extended or adjusted under 35 U.S.C. 154(b) by 0 days.

(21) Appl. No.: 09/533,088

(22) Filed: Mar. 22, 2000

Related U.S. Application Data

(60) Provisional application No. 60/134,956, filed on May 19, 1999.

(51) Int. Cl.
*G06Q 40/00* (2006.01)

(52) U.S. Cl. .............................. 705/37; 705/35; 705/36

(58) Field of Classification Search ................ 705/7, 705/35–38; 707/100, 104.1
See application file for complete search history.

(56) References Cited

U.S. PATENT DOCUMENTS

| | | | | |
|---|---|---|---|---|
| 4,903,201 | A | | 2/1990 | Wagner |
| 4,933,842 | A | | 6/1990 | Durbin et al. |
| 5,136,501 | A | | 8/1992 | Silverman et al. |
| 5,497,317 | A | | 3/1996 | Hawkins et al. ............ 364/408 |
| 5,563,783 | A | | 10/1996 | Stolfo et al. |
| 5,592,375 | A | | 1/1997 | Salmon et al. |
| 5,592,379 | A | * | 1/1997 | Finfrock et al. ............... 705/39 |
| 5,704,045 | A | * | 12/1997 | King et al. .................... 705/35 |
| 5,806,047 | A | * | 9/1998 | Hackel et al. ............ 705/36 R |
| 5,809,483 | A | * | 9/1998 | Broka et al. ................... 705/37 |
| 5,918,218 | A | * | 6/1999 | Harris et al. ................... 705/37 |
| 6,012,044 | A | * | 1/2000 | Maggioncalda .............. 705/36 |
| 6,014,643 | A | | 1/2000 | Minton |
| 6,058,379 | A | * | 5/2000 | Odom et al. ................... 705/37 |
| 6,061,662 | A | * | 5/2000 | Makivic ................... 705/36 R |
| 6,122,623 | A | * | 9/2000 | Garman ................... 705/36 R |
| 6,330,546 | B1 | * | 12/2001 | Gopinathan .................. 705/35 |
| 6,349,290 | B1 | * | 2/2002 | Horowitz ..................... 705/35 |
| 6,418,419 | B1 | * | 7/2002 | Nieboer et al. ............... 705/37 |
| 6,658,393 | B1 | * | 12/2003 | Basch .......................... 705/38 |

FOREIGN PATENT DOCUMENTS

EP 0790568 A1 * 8/1997

OTHER PUBLICATIONS

Anonymous, "Derivatives: The beauty in the beast"; The Economist; London; May 14, 1994; vol. 331, Iss. 7863; pp. 1-5.*
PCT International Search Report, Int'l filing date Mar. 22, 2000.

* cited by examiner

*Primary Examiner*—Ella Colbert
(74) *Attorney, Agent, or Firm*—St. Onge Steward Johnston Reens LLC

(57) ABSTRACT

A network based trading system and method are provided which combine economies-of-scale enjoyed by institutional investors and mutual funds with direct ownership of securities to permit individual investors to participate in the bond market in a cost effective manner. Through team investing, institutional economies-of-scale are created for individuals by allowing groupings of individuals to buy and sell bonds as a "team," thereby executing one cost-efficient trade in the institutional market rather than many smaller trades in the inefficient retail market. Also, through customer-to-customer (C2C) trading, customers are allowed to negotiate a trade directly with one another as an alternative to selling in the inter-dealer market. The system and method also incorporate an automatic risk assessment and trade approval routine for evaluating a proposed trade of a financial instrument which was received from a customer in an electronic form.

18 Claims, 20 Drawing Sheets

| Trade No. 588623009 | | —1002 |
|---|---|---|
| Account # | DEF678901234 | —1004 |
| Status | Executed | —1006 |
| Buy/Sell | Buy | —1008 |
| Amount | $10,000 | —1010 |
| Security name | Georgia Power 8% due 1/15/2010 | —1012 |
| Security type | Corp bond | —1014 |
| CUSIP No. | BF10905305 | —1016 |
| Execution method | C2C | —1018 |
| Market/Limit | n/a | —1020 |
| Limit price | n/a | —1022 |
| Time limit | n/a | —1024 |
| Order time | n/a | —1026 |
| Trade date | 4/19/1999 | —1028 |
| Settlement date | 4/22/1999 | —1030 |
| Price | 102.25% | —1032 |
| Accrued interest | $215.56 | —1034 |
| Gross amount | $10,440.56 | —1036 |
| Commission | $75.00 | —1038 |
| SEC fee | $0.00 | —1040 |
| Tax | $0.00 | —1042 |
| Service charge | $0.00 | —1044 |
| Net amount | $10,515.56 | —1046 |
| Execution market | C2C | —1048 |
| Sponsoring BD | X, Y and Z Partners | —1050 |

FIG. 13

Team Investing

1100

Click on the Team Name for more Team info.

Click here to Start a New Team. 1114

1102

| Active Teams | | | | | |
|---|---|---|---|---|---|
| Team Number | Name (click for more details) | Goal | Number Of Members | Current Commitments | Target Execution Date |
| T01123 | The Broke Parents Club | Send our kids to a grossly overpriced college in 10-14 years | 42 | $835,000 | 1/1/2000 |
| | 1112 | 1104 | 1106 | 1108 | 1110 |

*FIG. 14*

If you want to Start a New Team, submit your idea using the form below:

| Start a New Team | |
|---|---|
| Give your Team a name | |
| Action | ◉ Buy a Security or similar category of securities<br>○ Sell a Security or similar category of securities<br>○ Implement an Investment or Hedging Strategy |
| Describe the Team's goal (be brief) | |
| How much are you interested in placing with the Team? | Cash or market value of securities |
| When would you like to have the Team execute a trade? | Specify a date or timeframe |
| Your Name | |
| Account Number | |
| E-mail Address | |
| | Submit My Team Idea    Reset |

FIG. 15

Bonds For Sale 1300

These securities are being offered for sale by other Customers. All sellers must own the securities being offered in their account. All buyers must have sufficient cash in their account to fully pay for the purchase, including any commissions.

If you are interested in purchasing anything listed here, contact the seller directly to start negotiation of price.

| ID No. | Issuer | Amount | Ratings | Coupon | Maturity | Call Date | Call Price | Seller ID (Click to negotiate) |
|---|---|---|---|---|---|---|---|---|
| BF10905305 | Georgia Power | $10,000 | A/a2/A | 8% | 1/15/2010 | 1/15/1999 | 104.25 | ZZZ12345 |

Column references: 1302, 1304, 1306, 1308, 1310, 1312, 1314, 1316

If you want to buy, but nothing here suits your needs, CLICK HERE to post your buying interest on the Bond Wanted List.

Bonds Wanted 1400

These securities are being sought for purchase by other customers. All sellers must own the securities being offered in their account. All buyers must have sufficient cash in their account to fully pay for the purchase, including any commissions.

If you are interested in selling your bonds to a buyer listed here, contact the buyer directly to start negotiation of price.

| Bonds Wanted | 1402 | 1404 | 1406 | 1410 | 1408 | 1412 | 1416 |
|---|---|---|---|---|---|---|---|
| | ID No. | Issuer or Description | Amount | Rating Range | Maturity Range, yrs | Coupon Range | Callable? | Buyer ID (Click to negotiate) |
| | BW109 04999 | Electric or Telephone utility | $10,000 | A AA | 10 20 | 5% 9% | Yes | ABC111222333 |

If you want to sell, but these listing are not of interest, CLICK HERE to post your selling interest on the Bond For Sale List.

Post a "Bond For Sale" Notice
Your information (except personal info) will be posted exactly as typed.
Please check it before submitting.

| | | | |
|---|---|---|---|
| 1502 | Issuer or Description | | |
| 1504 | Amount | | |
| 1506 | Ratings | | S&P/Moody's/Fitch |
| 1508 | Coupon | | |
| 1510 | Maturity | | |
| 1512 | Call Date | | ("nc" if noncallable) |
| 1514 | Call Price | | ("nc" if noncallable) |
| 1516 | Your Name | | |
| | Account Number | | |
| | E-mail Address | | |

[Post This] 1520  [Reset] 1518

Post a "Bond Wanted" Notice
Your information (except personal info) will be posted exactly as typed.
Please check it before submitting.

| | |
|---|---|
| 1602 — Issuer or Description | ☐ |
| 1604 — Amount | ☐ |
| 1606 — Ratings Range | Minimum<br>⦿ AAA ○ AA ○ A ○ BBB ○ BB or less<br><br>Maximum<br>⦿ AAA ○ AA ○ A ○ BBB ○ BB or less |
| 1610 — Maturity Range | Min yrs ☐     Max yrs ☐ |
| 1608 — Coupon Range | Min % ☐     Max % ☐ |
| 1612 — Callable | ⦿ Yes   ○ No |
| Your Name | ☐ |
| 1616 — Account Number | ☐ |
| E-mail Address | ☐ |

[Post This]  [Reset]
  1620      1618

FIG. 19

Order Form

1700  You are placing a firm order for execution by MEK.
Please provide complete information.

| | |
|---|---|
| What is your account number? ▭ ←1704 | |
| What do you want to do? ⊙ Buy ○ Sell ←1708 | |
| How much? ▭ —1710    —1711a | |
| Will you accept less than this amount? ⊙ Yes ○ No  1711b | |
| If Yes: What is the minimum amount you will accept? ▭ | |
| And, in what minimum increments? ▭ —1711c | |
| What security? —1714 | |
| ⊙ Corporate Bond      ○ U.S. Agency Bond | |
| ○ Municipal Bond       ○ Common stock | |
| ○ U.S. Treasury Bond   ○ Stock option | |
| If a bond: | |
| Issuer name: ▭    Coupon, %: ▭ | |
| Maturity: ▭ | |
| Callable? ⊙ Yes ○ No   If Yes, first call date: ▭ | |
| CUSIP number: ▭ | |
| If a stock or stock option: | |
| Company name: ▭ or ticker symbol: ▭ | |
| If a stock option: | |
| Type: ⊙ Call ○ Put | |
| Strike price: ▭    Expiration month: ▭ | |
| At what price? | |
| ☐ Market  ☐ Limit price: ▭   ☐ Stop price: ▭ | |
|   —1720    —1722            —1723 | |
| When? | |
| ⊙ Day ○ Market open ○ Market close ○ GTC - Good 'Til Cancelled | |
| If GTC, please specify a "Drop Date" ▭ | |
| —1724 | |

[Send order to MEK]  [Clear this order]

FIG. 20

NETWORK-BASED TRADING SYSTEM AND METHOD

CLAIM OF PRIORITY

This application claims priority from U.S. Provisional Patent Application Ser. No. 60/134,956 filed May 19, 1999.

FIELD OF THE INVENTION

The present invention relates to an improved system and method for trading financial instruments such as bonds, as well as fractional portions of traded instruments, and more particularly to a system and method which applies trade-approval rules to a proposed trade so that the customer's proposed trade can be approved without manual intervention, which provides anonymous customer-to-customer trading, and which permits aggregated trading among anonymous customers with common investment goals.

BACKGROUND OF THE INVENTION

Traditionally, the securities markets have not been hospitable to individual investors. This is especially true of the bond market. Bonds exist in minimum units of $1,000 principal amount for taxable bonds or $5,000 for municipal bonds. It is essentially an over-the-counter market, i.e., there is in practice no central exchange for bond trading. The prospects of a national bond exchange are dim in view of the fact that broker dealers are presently enjoying large profits through the status quo. Moreover, except for U.S. Government securities, bond price quotes are only readily available to brokers and dealers. While some bonds trade on the New York and American Stock Exchanges, such trading is limited to listed issues, of which there are very few corporate bonds and no municipal bonds or Treasury bonds. Fewer corporations are now listing their bonds, even though the listing service is free to stock-listed companies.

As a group, individual investors have an enormous asset base. However, trading by individual investors is fragmented among relatively tiny pools of money, resulting in small trades of $5,000 to $10,000. The individual investor attempting to execute a $10,000 trade must compete with million-dollar institutional orders, particularly in the bond market. At this size of trade, pricing for, and availability of, bonds is unattractive and therefore trading and participation by individual investors in the bond market is relatively infrequent. While there exists an active "odd-lot" market, that is, a less-than-institutional sized market, for individual bond trades, the choices are limited (e.g., choice of issuer, credit rating, maturity, interest rate, call protection, etc.) unless the investment is an "individual round lot" of $100,000 or more. Even at this larger size of trade, however, attractive prices and bond selection are not assured. For individual investors, the spreads are large, with 2 to 6 points (i.e., % of principal amount) being common, and, when coupled with commission charges, the return-on-investment (ROI) can be significantly compromised. In addition, the time for execution ranges on the order of days rather than seconds as in the more liquid equity markets.

Individual investors have the same fixed costs in trading bonds as institutional investors. Trade-processing costs average about $50 per trade, regardless of the size of the trade. For a $1 million trade, this cost is negligible. But for a $5,000 trade, such costs constitute a full point before considering the spread. Such costs have also discouraged trading and direct ownership of bonds by individual investors.

Accordingly, the typical investors in the bond markets have been large institutional investors, primarily pension funds, mutual funds and insurance companies. With asset pools of $100 million or more, such institutions can trade regularly in amounts of $1 million or more. Both the corporate and municipal markets are highly liquid for institutional investors, with bid/offer spreads being on average $⅛$–$½$ points in price, depending on maturity.

Another problem with the current securities markets is that there is currently no vehicle by which securities holders may readily trade securities, or fractional shares thereof, directly with one another. Buyers and sellers must, therefore, use an intermediate broker and incur the high fees and costs associated therewith. As discussed above, such fees and costs can be prohibitive, particularly when relatively small transactions are involved. Furthermore, as there is no central exchange for bonds, it may be difficult for a buyer who is seeking to purchase a specific bond to locate a seller who is selling that specific bond. This is particularly true when only a small number of bonds, or a fractional share of a bond, are at issue. Thus, the bond market is an illiquid market in that even if an investor is able to purchase a small number of bonds, or a fractional share of a bond, that investor may not readily sell such bonds if cash is quickly needed or desired. Ownership of bonds, therefore, has not been regarded as an attractive alternative to cash-on-hand for the individual investor.

A further problem with the current bond market relates to longstanding securities industry regulations which require that the firm through which the trade is made ensure that the customer's investing activity is suitable for that customer based upon the customer's financial situation and investing expertise. Traditionally, these regulations have been met by intermediate brokers by manually reviewing and approving each trade prior to settlement. As far as the inventor is aware, this approach continues today with known Internet-based trading systems, such as those made available by E*Trade, Charles Schwab and Fidelity, with back office staff reviewing each order and manually approving same. Such manual review and approval increases the costs associated with securities trading.

What is desired, therefore, is a securities trading system which permits individuals to own and trade bonds directly through a cost effective trading system, which makes short-term bonds an attractive alternative to cash-on-hand for the individual investor, and which provides an expert system for effectuating automated trade approvals for each securities trade of each individual investor.

SUMMARY OF THE INVENTION

Accordingly, it is an object of the present invention to provide a securities trading system which is hospitable to individual investors.

Another object of the present invention is to provide a securities trading system which encourages trading and direct ownership of bonds by individual investors Another object of the present invention is to provide a securities trading system having the above characteristics and which capitalizes on the large asset base of individual investors as a group.

A further object of the present invention is to provide a securities trading system having the above characteristics and which facilitates the execution of relatively small bond trades.

Still another object of the present invention is to provide a securities trading system having the above characteristics and which reduces the time and costs associated with executing bond trades.

Yet a further object of the present invention is to provide a securities trading system having the above characteristics and which provides a vehicle by which bond holders may readily trade bonds, or fractional shares of bonds, directly with one another.

Still a further object of the present invention is to provide a securities trading system having the above characteristics and which provides a central exchange for bonds.

Still another object of the present invention is to provide a securities trading system having the above characteristics and which facilitates the pairing of a buyer who is seeking to purchase a specific bond with a seller who is selling that specific bond.

Yet another object of the present invention is to provide a securities trading system having the above characteristics and which automates required reviewing and approving processes for each trade prior to settlement.

These and other objects of the present invention are achieved by provision of a system which combines economies-of-scale enjoyed by institutional investors and mutual funds with direct ownership of securities to permit individual investors to participate in the bond market in a cost effective manner. Through team investing, institutional economies-of-scale are created for individuals by allowing groupings of individuals to buy and sell bonds as a "team," thereby executing one cost-efficient trade in the institutional market rather than many smaller trades in the inefficient retail market. Also, through customer-to-customer (C2C) trading, customers are allowed to negotiate a trade directly with one another as an alternative to selling in the inter-dealer market.

In one respect, the invention provides a method for approving a proposed trade of a financial instrument which was received from a customer in an electronic form. This method takes advantage of the electronic transmission of orders to buy or sell a financial instrument by electronically parsing the trade ticket to obtain the transaction details of the proposed trade. Also, the automated system obtains account information for the customer who submitted the electronic form, including that customer's "risk rating." As described below, a risk rating is assigned to each customer participating in the trading system upon opening an account and characterizes the experience of the customer and the nature of the account (e.g., individual, IRA, custodial, etc.). Periodically, the risk rating may be updated to reflect current financial conditions of the account or to comply with regulatory requirements. The suitability of the proposed trade for that customer is then determinable using the transaction details of the proposed trade. The method automatically approves the proposed trade if the risk rating and the suitability bear a predetermined relationship to one another which indicates that the proposed trade should be, in fact, suitable for that customer.

In a preferred form, the automated trade approval method of the invention applies one or more rules from a rule base to the transaction details of the proposed trade. The rule base may also use the account information of the customer in determining the suitability of the proposed trade. Once the proposed trade is approved, the system may automatically generate a confirmation notice of the approval. On the other hand, trades which may be unsuitable result in the automatic display of an unsuitability warning.

Another aspect of the invention provides a method for aggregating the common investment desires of several customers so that they can purchase, as a team, a quantity of a common financial instrument in one trade. This method calls for each customer to anonymously post, over the Internet for other customers of the system to see, a desire to effect a team trade. Each customer desirous of participating in the team trade then anonymously provides a tentative financial commitment to the automated system. This commitment is also obtained over the Internet, and team members may join the team and communicate anonymously with other team members to exchange concerns and ideas about how a particular investment goal might be achieved. Once the transaction is finalized by the team members, financial commitments are also finalized. The system thereafter purchases in a single trade a quantity of the financial instrument, which has a total cost no greater than the sum of the obtained financial commitments. The accounts of each of the team members is then charged in an amount up to their respective financial commitments. Also, each team member's account is credited with ownership of a proportionate share of the financial instrument that was just purchased. A customer's proportionate share is the amount charged to the customer divided by the total cost of the purchase.

In another aspect, the invention provides a method for directly trading a financial instrument directly between two customers without an intermediate broker. This method leverages the Internet by bringing a seller together with a prospective buyer or a buyer together with a prospective seller. The method includes the step of initially establishing a secure and anonymous communication link between the two customers on the Internet. Through the secure connection, the customers negotiate a price for a proposed trade without knowing each other's identity. However, both customers are customers of the system. When the customers have agreed upon a price for the proposed trade, that price is provided to, or obtained by, the automated system which then executes the proposed trade.

In a preferred form, this customer-to-customer trading method includes the additional step of confirming, without human intervention, that the agreed upon price is fair prior to executing the proposed trade. This is of particular value in illiquid markets such as some bonds and stocks. Also in a preferred form, the customer-to-customer trading method utilizes the automated trade approval methodology referred to above and described in detail herein.

The present invention also relates to trading systems which are accessible through the Internet. A system in accordance with one or more aspects of the invention is configured as a programmed computer or server which implements the above described methods, including one or more of the following: approving proposed trades of financial instruments without human intervention; aggregating the orders of several customers for a common financial instrument to purchase/sell in a single trade a larger quantity of that financial instrument; executing a trade of a common investment package for a team of customers; permitting direct and preferably anonymous trading of financial instruments between first and second customers; and providing customer support services such as prospectus information, news, account balance and credit information, chat rooms, and advice and answers to customer inquiries. The computer or server includes a processor which is programmed as by a software program to implement the trading system, data storage which maintains customer data including account balance information and current holdings, and communication links which permit electronic data interchange between the trading system's computer and the computers of sponsoring broker-dealers and/or customers which are used to access the trading system. The process flows illustrated in the accompanying Drawings illustrate the programs that are implementable on the trading system's computer or server.

The invention and its particular features and advantages will become more apparent from the following detailed description considered with reference to the accompanying drawings.

BRIEF DESCRIPTION OF THE DRAWINGS

FIG. 13 illustrates transaction details of a completed trade wherein a purchasing customer bought a bond;

FIG. 14 illustrates a team investing web page which identifies the team web pages of active teams;

FIG. 15 illustrates a form for starting a new team web page;

FIG. 16 illustrates a bonds-for-sale web page;

FIG. 17 illustrates a bonds-wanted web page;

FIG. 18 illustrates a bonds-for-sale data entry form;

FIG. 19 illustrates a bonds-wanted data entry form; and

FIG. 20 illustrates an order form that may be used to submit a purchase or sale order of a particular financial instrument.

DETAILED DESCRIPTION OF THE INVENTION

Figure 1:
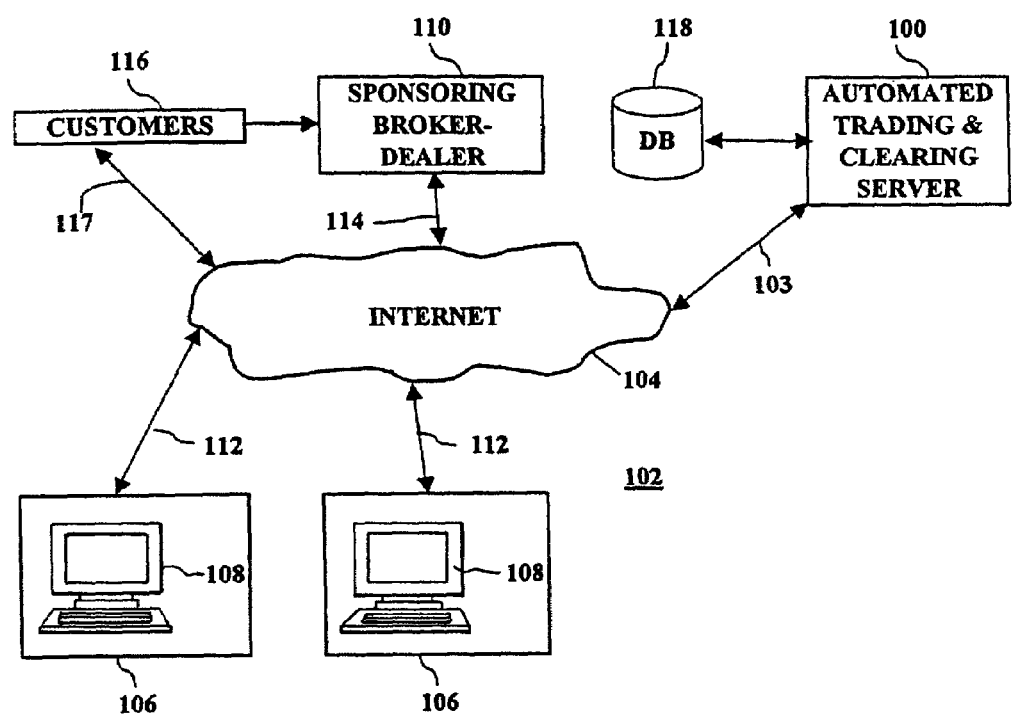
FIG. 1 illustrates a hardware arrangement that may be used to implement a system and method in accordance with the present invention.

By way of overview and introduction, a server 100 which is configured to implement the system and method of the invention is illustrated in FIG. 1. FIG. 1 shows a hardware arrangement 102 including an automated trading/clearing server 100 with a bilateral communication line 103 for communication over the Internet or other networks 104. By way of the Internet 104, the automated trading/clearing server communicates with plural customers 106 using remote stations or personal computers 108. The customers 106, also refered to herein as "traders," are any persons or entities desiring to sell, purchase, or otherwise transfer ownership interest in securities. The server 100 also communicates with Sponsoring Broker Dealers (SBD) 110 through the Internet 104. The customers 106 and the SBDs 110 connect to the Internet over respective communication lines 112, 114. A plurality of customers 106 at widely dispersed geographic locations can communicate with the server 100 through the Internet 104. Likewise, any number of SBDs can refer customers to the automated trading/clearing server 100 through the Internet 104 or other means. Each SBD has a number of its own customers 116 that access the automated trading/clearing server 100 through the SBD 110 or through direct connections to the Internet 104 by way of connection 117.

Figure 2:
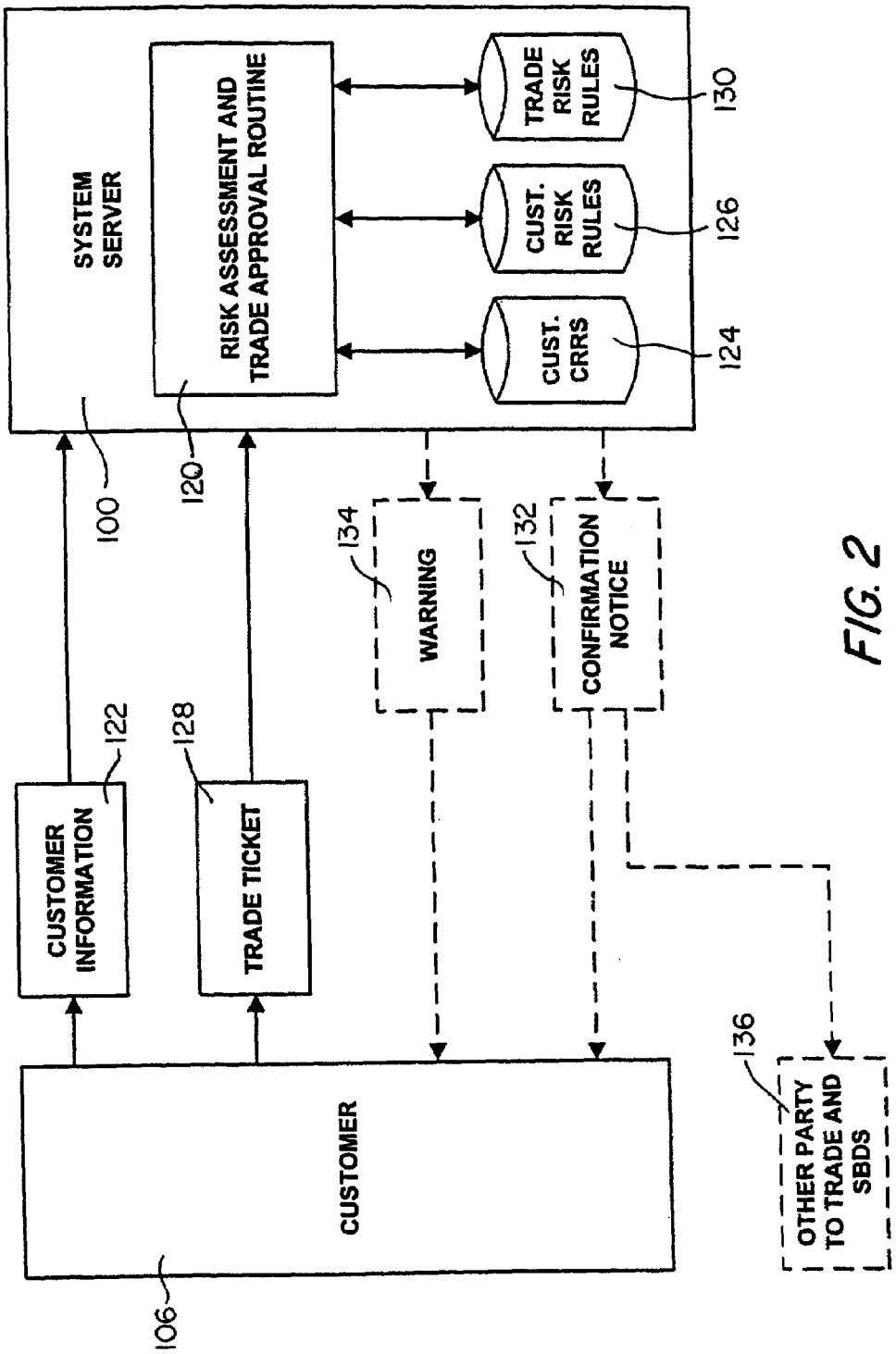
FIG. 2 is a block diagram of an automated risk assessment and trade approval portion of the system of FIG. 1.

Referring now to FIG. 2, an automated risk assessment and trade approval routine 120 of the system is shown. When a customer 106 logs onto the system for the first time, customer 106 transmits customer information 122 to server 100. The information includes information concerning such matters as the customer's financial resources, the customer's trading experience, the type of customer account, and the like. Risk assessment and trade approval routine 120 receives the customer information 122, and uses this information to assign a customer risk rating ("CRR") to the new customer, which CRR is stored on a database 124 of customer CRRs. The CRR reflects the customer's financial resources (such as net worth, annual income data, etc.) and investment expertise. The CRR is determined automatically for each customer in response to the financial and investment background information provided in the application form, and is based upon a set of customer risk assessment rules stored on a database 126.

Later, when a customer 106 attempts to execute a trade by sending a trade ticket 128 to server 100, the customer's trades are reviewed and approved automatically by risk assessment and trade approval routine 120 which assesses the suitability of a trade for that particular customer 106. The server 100 obtains the transaction details of the proposed trade from the trade ticket 128. The transaction details include all of the information entered into the trade ticket by the customer 106. Risk assessment and trade approval routine 120 used these transactions details to retrieve that customer's CRR from database 124 and to assign a trade risk rating (TRR) to the proposed trade. The TRR reflects the underlying economic risks of the instrument itself or the nature of the trade within the overall context of the customer's risk profile (which is reflected in the CRR), and is based upon a set of trade risk assessment rules stored on a database 130. It should be noted that the term "database" as used herein refers to a set of related data. Therefore, the various databases discussed herein may each be a separate, individual databases or they may be interrelated. Accordingly, these various devices may be located in separate physical devices or may reside in a single housing, and some or all of the databases may share some or all of the data therein with some or all of the other databases.

After the TRR is determined, it is compared to the customer's CRR, that is, the TRR is gauged to the risk rating that was assigned to the particular customer who is seeking approval for the trade. The gauge is preferably whether CRR is ≦TRR, although other predetermined relationships can be used. Thus, if the customer risk rating is less than or equal to the determined trade risk rating, then the trade is automatically approved by risk assessment and trade approval routine 120. Trade confirmation notices 132 are provided to the buyer, seller, and their SBDs 136, and trade settlement is scheduled by the server 100. If the customer risk rating is not less than or equal to the determined trade risk rating, the details in the proposed trade ticket trigger an unsuitability warning 134 which is transmitted to customer 106. The warning 134 can advise the customer 106 of the potentially high market risk, potential impact on the customer's investment portfolio or other warning.

Preferably, the suitability of the proposed trade is rated for both the buyer and seller. Also preferably, each party is not made aware of any unsuitability determination associated with the other party to the trade.

Figure 3:
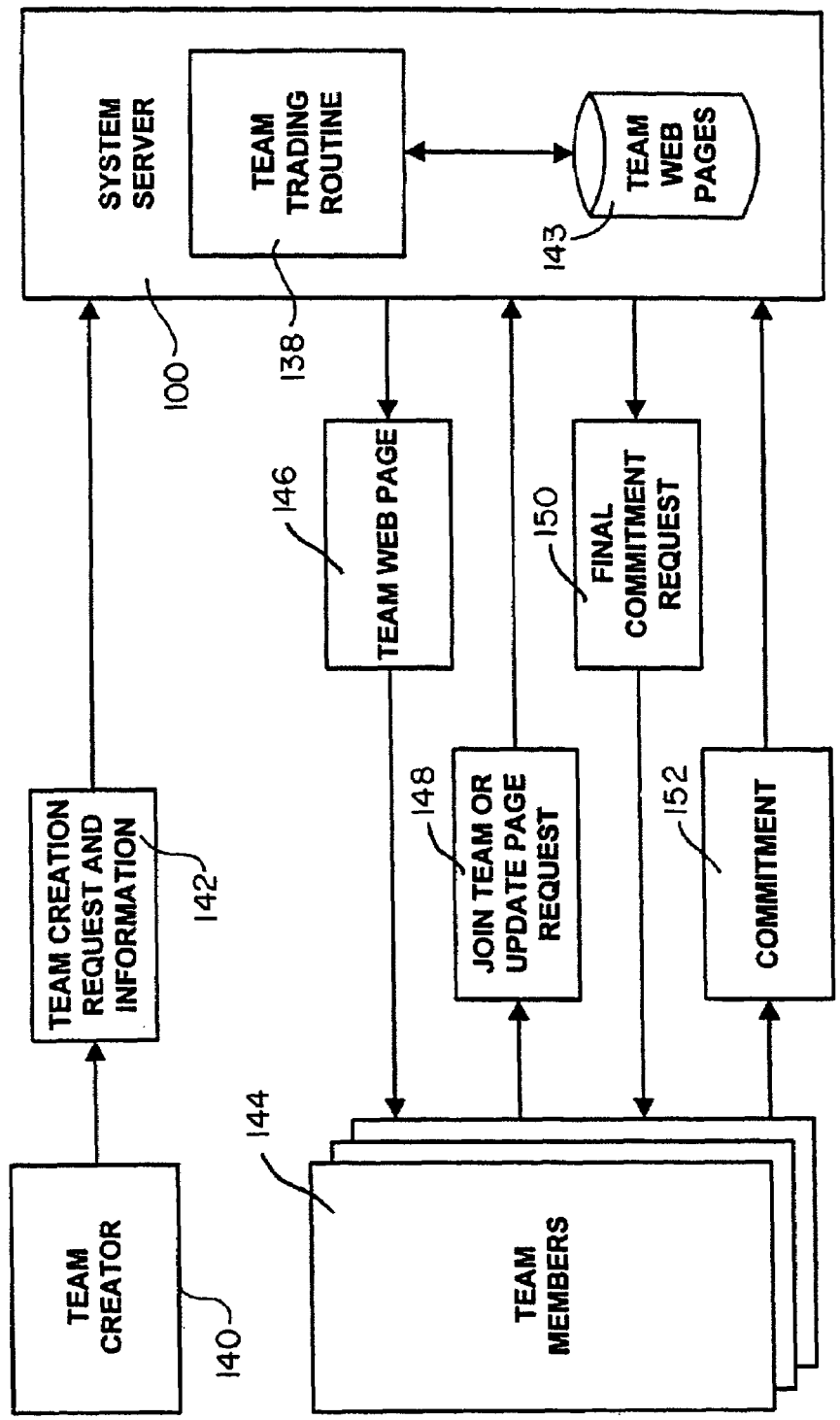
FIG. 3 is a block diagram of a team trading portion of the system of FIG. 1.

Referring now to FIG. 3, team trading, in accordance with an aspect of the present invention, permits individual investors to aggregate their respective buy or sell orders for execution as a single order of a given quantity of a common financial instrument or investment package. Necessarily, the team members must share an investment goal and agree to a common investment vehicle. A team trading routine 138 executing on system server 100 enables this by bringing together investors with common interests and permitting them to exchange ideas and obtain system-provided information relevant to their investment goal, such as, for example, specific bonds which according to present market conditions satisfy the goal.

A user 106 must first decide whether to start a new team or review existing teams and perhaps join and participate in them. A team creator 140 starts a team by entering a start-team request and providing start team information 142. The start team information specifies, generally, the investment goal that the team creator 140 has in mind, such as the type of issuer (e.g., household name corporation or municipality), the credit quality (e.g., AAA or AA.), the maturity (e.g., 1 or 5 years), and the purpose of the investment (e.g., college education or retirement).

The team trading routine 138 examines the team pages database 143 to determine whether or not one or more teams exist which address the stated investment goal of the team creator 140, and if not, establishes a team page which addresses that goal and stores the newly created team page on team pages database 143. In other words, if a need for an additional team is confirmed, then a new team page is created. Because a number of team pages are provided by the system, each having its own investment goal and investment package (which may comprise only one financial instrument), the customer may be better served by being directed to an existing team than to be the sole member of a new team. If such is the case, team creator 140 essentially becomes a potential team member 144.

Upon creating the new team web page, the system processes the information in the start team information 142 in view of current market conditions and posts on the team web page the specific instruments which can be purchased in order to reach the team investment goal.

Other customers, or potential team members 144, of the system 100 are notified of the new team, for example, by email, by a banner notice to all customers upon logging on to the system, or simply by including the new team web page for display along with the other team web pages. Preferably, potential team members 144 can review a list of existing teams to find one of interest, or can perform a search for a particular team using a standard website search engine. Once a team page of interest 146 has been located in the list, it is displayed to potential team members 144. A potential team member 144 may then send a request to join the team, or if already a member, may send a team page update request 148 to exchange messages, open a chat session or obtain updated parameters that may be posted on the team web page 146 from time-to-time. Thus, through the team web page, team members 144 may exchange ideas, discuss important topics and debate differences of opinion prior to making a team trade.

As the trade date approaches, then a final financial commitments request 150 is sent to the team members 144 to aggregate sufficient funds to implement a single larger trade, preferably an institutional-sized round lot trade. Each team member 144 can specify his or her investment in terms of total amount of dollars to be invested (which may result in the ownership of fractional bonds) or in terms of face amount of whole bonds. Each customer specifies his or her respective commitment 152 by posting that commitment 152 to the system. Once commitments 152 are received from all team members 144, the team is closed and the trade executed.

Figure 4:
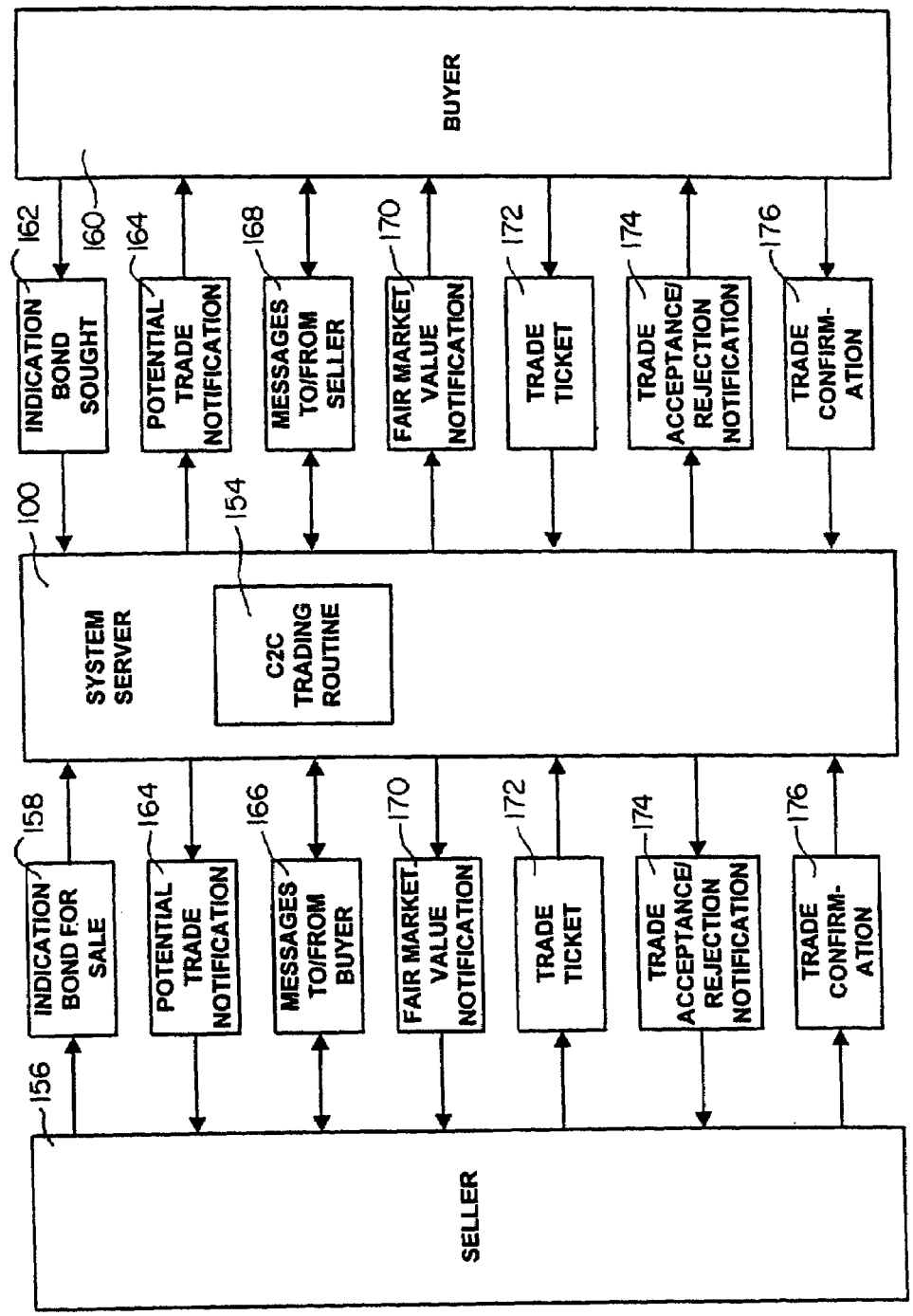
FIG. 4 is a block diagram of a customer to customer trading portion of the system of FIG. 1.

Referring now to FIG. 4, a customer-to-customer (C2C) trading routine 154 is shown. In accordance with this aspect of the invention, one customer trades directly with another for the instrument that he or she wishes to purchase or sell without an intermediate broker. The C2C trading routine 154 receives from a seller 156 an indication 158 of a bond held by the seller 156 which is available for direct sale to another customer. The C2C trading routine 154 also receives from a buyer 160 an indication 162 of those bonds, or types of bonds, that particular buyer 160 is interested in purchasing. The indications 158, 162 may be in the form of "bonds for sale" and/or "bonds wanted" lists as described fully below, although such is not required.

Once a potential trade is found to exist, that is, a seller 156 is matched with a buyer 160, the seller 156 and buyer 160 qualifications for negotiating the trade are verified. Specifically, the C2C trading routine 154 confirms that the buyer 160 has sufficient funds by examining the customer's account to determine how much cash is available, and perhaps how much credit can be extended in any associated margin account. The C2C trading routine 154 also confirms that the seller 156 has the bond being sold in his portfolio.

Once the seller 156 and buyer 160 qualifications have been verified, the C2C trading routine 154 generates and transmits to the seller 156 and the buyer 160 a notification 164 of the potential trade and establishes a communication link between the two customers. Thus, the seller 156 is able to send/receive messages 166 to/from the buyer 160, and the buyer 160 is able to send/receive messages 168 to/from the seller 156, thus allowing for communication and negotiation between the parties.

The C2C trading routine 154 also determines the fair market value 170 of the bond at issue, and transmits the fair market value 170 to the seller 156 and the buyer 160 as a base line comparison value to guide the parties to a fair trade. The fair value of the listed bond is calculated in light of the trade date, settlement date, accrued interest, appropriate Treasury yield and other relevant market information.

When the seller 156 and the buyer 160 believe that they have come to an agreement, including an agreement as to price, each party submits (posts) his or her respective trade ticket 172 and the C2C trading routine 154 determines whether the terms from the two trade tickets 172 match. If the tickets do not match, then the buyer and seller are notified of the discrepancy 174 and communications may again proceed to correct the discrepancy or cease negotiations. If the terms do match, however, then, in accordance with a further aspect of the invention, the fairness of the agreed upon terms to both parties is assessed automatically and without manual intervention, as described fully below.

If the price is not deemed fair, then the buyer and seller are advised of this discrepancy 174 and the anonymous communications between the buyer and seller can again proceed. This mechanism ensures that one customer does not take advantage of another in a direct trade. However, if the price is determined to be fair (or if buyer and seller both agree to the negotiated price despite a system warning), then the buyer and seller are notified that the trade can be executed 174 and the system obtains the confirmation 176 from both parties that the trade is to be executed in accordance with the trade tickets 172. Thereafter, the trade may be executed and subsequently settled.

The present invention will now be described in more detail with respect to FIGS. 5–20.

Figure 5:
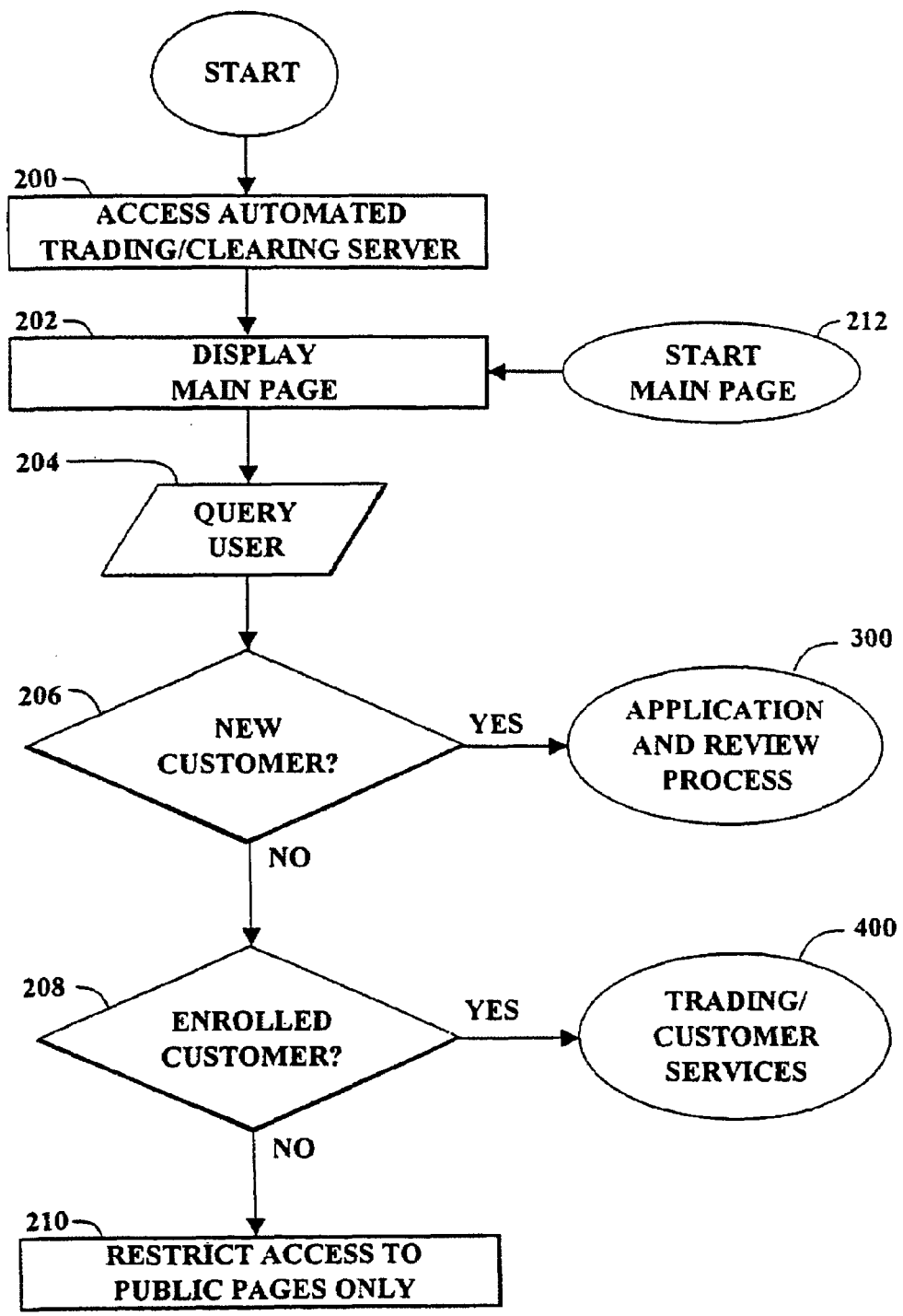
FIG. 5 is a flow diagram of a main or home page provided by the system of FIG. 1.

With reference now to FIG. 5, a person connecting to the server 100 through the Internet 104 first accesses the server at step 200. Preferably, access is achieved using a standard web browser such as commercially available from Microsoft Corporation of Redmond, Wash. under the name Internet Explorer® or from Netscape Communications Corporation under the name Netscape® Communicator or through a customized application developed specifically for use with this system. The customer 106, 116 communicates with the server 100 using any conventional electronic data communication link such as a modem.

Upon initial access to the server 100, a main page 212 is displayed at step 202 which includes buttons or links to further pages within the website. Through buttons or links, the person accessing the server 100 is queried at step 204 to input data concerning whether the person is a new customer, an existing customer or a member of the public seeking information about the trading and investing services that are provided by the system of the present invention. At steps 206 and 208, the user's input is tested to see whether the user is a new customer or an existing customer, respectively. If the user is a new customer, then the user will be directed to further pages in the website to complete an application. Otherwise, the system tests the user's input at step 208 to determine whether the user is an existing customer. If the user is an existing customer, then the customer is directed to customer-only services provided by the system, described below.

If the user who has accessed the server is neither a new customer nor an existing customer then the server restricts that user's access, at step 210, to only the public pages, which may provide marketing or other information concerning the trading and investing services that are available to customers.

1. New Customers and Customer Risk Rating Assignments

Figure 6:
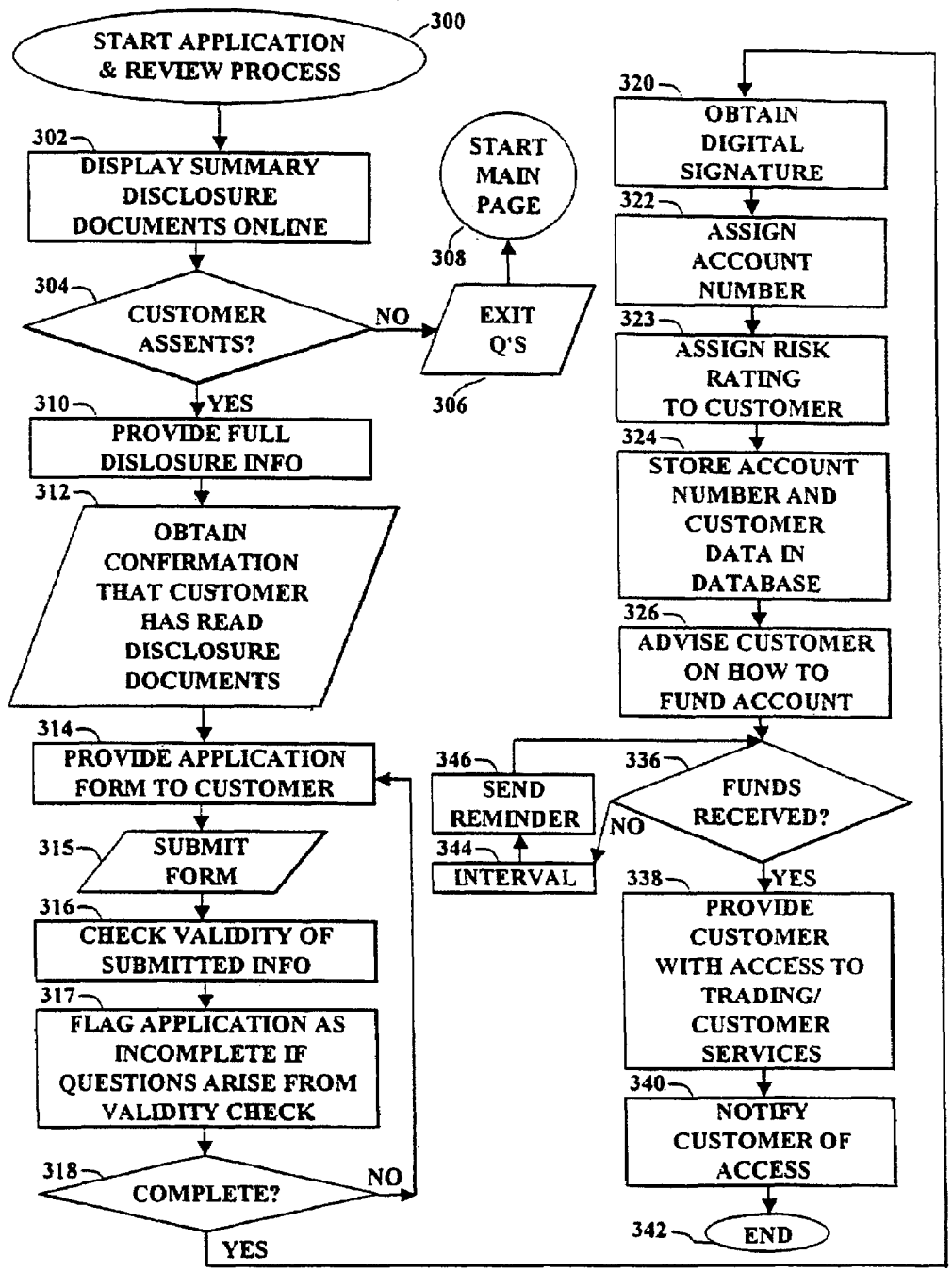
FIG. 6 is a flow diagram of a customer enrollment process provided by the system of FIG. 1.
Figure 7:
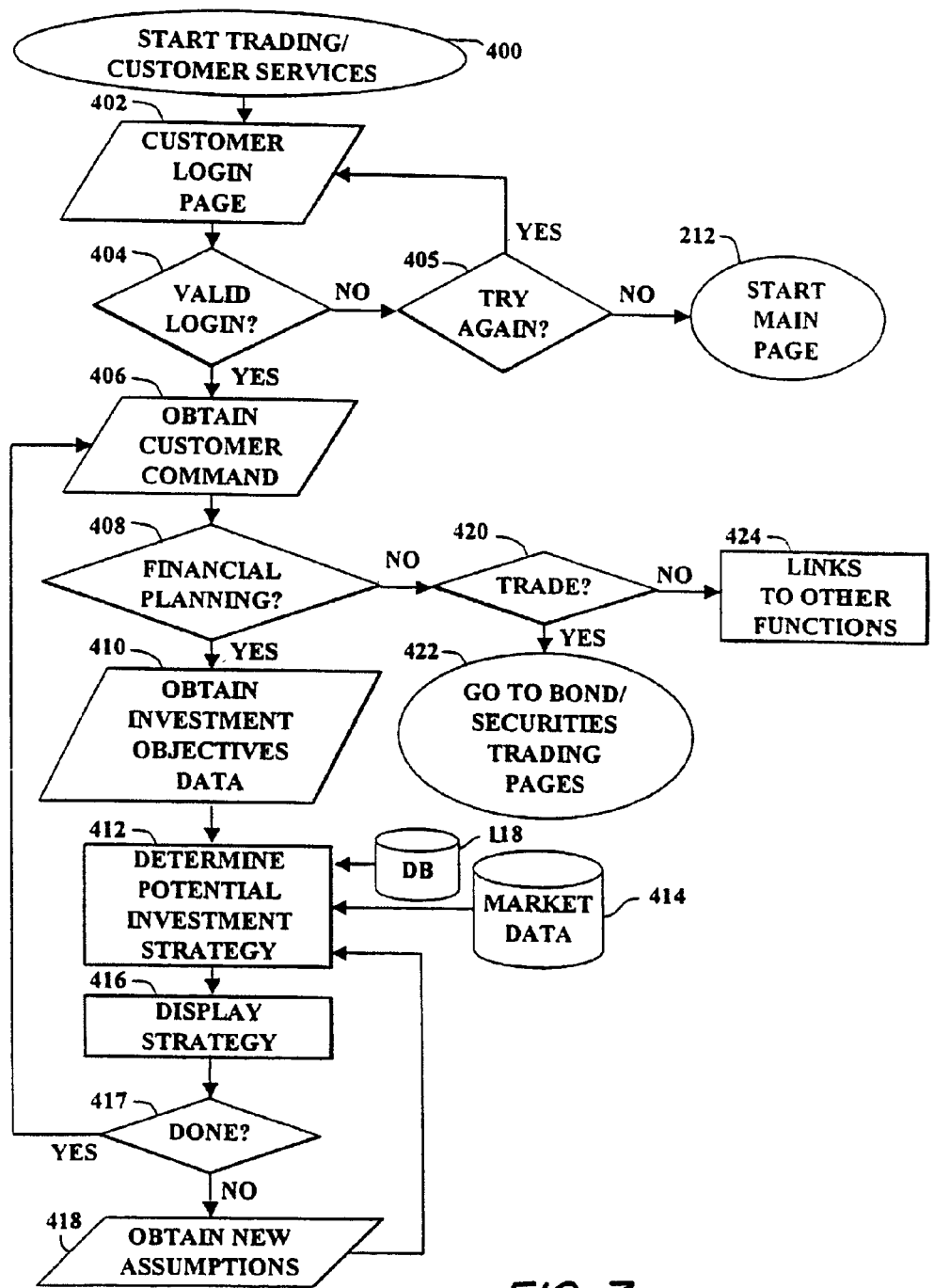
FIG. 7 is a flow diagram of customer login and services pages provided by the system of FIG. 1.

In FIG. 6, the application and review process 300 commences in response to the user inputting at step 204 that he or she is a prospective new customer. The application and review process comprises one or more secure pages within the website of the trading system 100. Initially, the prospective new customer is presented at step 302 with basic disclosure information as required by the SEC and other organizations, as well as the rules of operation of the broker operating the trading system 100. Preferably, this information is presented in summary form. The prospective new customer must assent at step 304 to conditions required to open and maintain an account with the firm. In addition, the new customer must review full disclosure documentation in order to be provided with a new customer application form.

The conditions for opening an account with the firm may include the customer's agreement to having "normal" communications conducted electronically by e-mail or through the website. "Normal" communications include receipt of trade confirmations, account statements, prospectuses and official statements. Other communications may include account balances, relationships with other firms, and other indicia of experience in trading or financial ability.

In the event that the prospective new customer does not agree to conducting business in the manner required by the firm, then that person may be provided with a questionnaire at step 306 so that the firm may better understand what guided that person's decision. That person is then directed to the main page at step 308 (see step 212 of FIG. 5).

In the event that the customer is comfortable with the conditions for opening an account with the firm, then at step 310 the customer is presented with a page which provides full disclosure documentation to the prospective new customer. The page may itself include full copies of the disclosure documents or may include links to full text files which may be stored at the server 100 as a word processing file, plain text file or in a proprietary format such as Adobe Acrobat® of Adobe Systems Incorporated. The prospective new customer can click on each of the links to read and review the documents immediately or to download them to their computer 108 for future reference. Once the user has downloaded the disclosure documents and confirmed at step 312 that he or she has read the disclosure documentation, an application form is provided to the customer at step 314.

The page (or frame) containing the application form is conveyed to the customer 106, 116 through a secure socket layer (SSL) connection. The individual completes the application form and submits it at step 315 to the firm in a conventional manner, for example, by clicking a submit button in the application form. It should be understood that the application form may comprise a series of pages, each of which requires different and additional information in order to set up an account. The information includes the customer's name, address, information concerning the trading experience of the customer, and the like. As each form is submitted to the server 100, the information in that form may be saved in a database 118 (see FIG. 1). Also, as each form is completed (e.g., by pressing a submit button) an embedded script or server-side program can be used at step 316 to validate the entries and prevent the omission of any required information. Invalid entries are flagged at step 317. In the event that required information is not included in the form and these are flagged entries, as tested at step 318, then the form is redisplayed to the individual with previously entered information echoed (that is, included) in the form. The individual can now correct or provide further information and resubmit the form at step 315 for further review. Some data may require manual review, but substantially all of the information can be processed automatically.

In the event that the form is correctly filled out, the application is digitally "signed" by the new customer with a "sigNETure." The "sigNETure" includes specific information concerning the customer such as a date, the customer's name and social security number and perhaps further information to identify the customer. The digital signature is obtained at step 320 and signifies that the customer has agreed to all of the terms for opening an account and that the requisite disclosure documents have been read.

At step 322, an account number is generated and sent to the customer's browser along with further instructions on how to open the account. At step 323, a customer risk rating ("CRR") is assigned to the new customer, and the new account and customer data is stored in the database 118 at step 324. The CRR is based on the customer's financial resources (such as net worth, annual income data, etc.) and investment expertise. The CRR is determined automatically for each customer in response to the financial and investment background information provided in the application form. The risk assignment routine parses the contents of the submitted forms, extracts data from some of the fields, and uses that data to determine the CRR. The risk rating for each customer preferably comprises a code consisting of an integer relating to experience, understanding, and risk tolerance and an alphabetic character which characterizes the type of the account. The Risk Rating Table below illustrates some exemplary CRR codes that can be assigned in different combinations to different customers.

RISK RATING TABLE

| Number/Letter | Meaning |
| --- | --- |
| 1 | Advanced understanding of risk; extensive experience with individual securities; has extensive financial resources. |
| 2 | Moderate understanding of risk; limited or no experience with individual securities; invests primarily in mutual funds; has moderate financial resources. |
| 3 | Beginning investor; limited understanding of risk; little or no investing experience, besides money market instruments or funds; has limited financial resources. |
| A | Extensive financial resources; qualifies as an "accredited investor" |
| M | Custodial/Trust account for a minor |
| R | Retirement account |
| X | Missing important information for determining suitability |
| O | No extra suitability considerations |

If a customer does not supply the information necessary to assign a risk rating, a 3× default rating is assigned. That rating will cause all securities purchases to be considered potentially unsuitable. Preferably, the customer is advised of this fact and encouraged at the time that the application is being submitted to provide the information that is needed to complete his or her CRR assignment and that information is maintained in confidence by the system.

At step 326, the customer is advised as to how to fund the account, including how to transfer securities from another account into the new account and how to send or wire cash. The trading system 100 then awaits the receipt of funds which is tested periodically at step 336. If the funds have been received, then at step 338 the customer is provided with access to the trading/customer services of the trading system 100. The customer is notified of this new status at step 340, preferably by email, and the customer intake process of FIG. 6 terminates at step 342. On the other hand, if funds have not been received within a predetermined interval at step 344, then a reminder is sent at step 346 to advise the applicant that funding has not yet been received. This provides the applicant with notice to follow-up with his or her prior broker or IRA trustee to determine why funds have not yet been transferred. If a substantially long period of time has passed without funding the account, the application may be canceled and an email notice may be sent to the applicant regarding the same.

When the customer is notified of access to the trading/customer services, he or she may be further notified of further instructions on how to start using the account.

Certain documents may require a manual signature, for example, a request to transfer funds from another broker. Such forms can be downloaded by the customer from the trading system 100 or sent by regular mail for completion, signature and mailing to the institution holding such securities. Such documents also would be used by outside service providers such as a IRA trustee or prior broker who may not permit sigNETures.

2. Services for Enrolled Customers

Any customer already enrolled in the trading system 100 can access the trading and customer services pages of the system by identifying themselves as a customer at step 204 (FIG. 5). That person is then directed to the customer-only portion of the website which includes various routines and processes commencing at step 400 of FIG. 7. At step 402, the customer enters his or her identification at a secure customer login page. The customer name and password (or other suitable identifiers known only to the customer and the trading system 100) are entered at the login page and tested at step 404 for validity. If the identifier is not known to the system 100, the person is given at least one more chance at step 405 to enter the correct identifier, or to return to the main page at step 212.

Only customers who input identifying information which matches the information previously stored in the database 118 at the server 100 can access the financial planning services and trading web sites made available by the server 100.

Once identified, the customer selects from a variety of services, including financial planning services, trading services and other functions and services that are made available by the system. The customer selects the service he or she desires at step 406.

a. Financial Planning Services

If financial planning services are selected, as determined at step 408, then investment objective data is provided by the customer at step 410 which the system processes against current market data to determine a potential investment strategy. Financial planning is not the subject of the present invention; however, it may include the determination of a series of transactions to be made in order to invest funds so as to meet or exceed long-term or short-term investment goals. Briefly, the investment objectives data includes an investment goal such as preservation of assets or the degree of risk tolerance permitted to accumulate funds to finance a 10 year old's college education. The investment objective data may further include personal and family financial information such as: liquidity; indebtedness (e.g., any mortgage or credit card debts); insurance coverage; number, age and income generated by family members; prior year tax information; real estate and partnership interests; and the like. Using the data entered by the customer at step 410, a potential investment strategy determination is made at step 412. The determination may be based upon further information such as the risk level assigned to the customer (see step 323) and current market data 414 provided from a data store or other information source (e.g., another website). The determination of the investment strategy is made by an optimization routine which selects from among many potential investment vehicles one or more transactions which the model concludes will lead to the customer's investment goal. The determined strategy is displayed at step 416, and the customer, if not done at step 417, can thereafter provide new or further assumptions at step 418 to have a revised strategy determined at step 412, or can return to the selection command page by looping back to step 406 through a suitable link from the display strategy page.

The customer can execute one or more electronic trades which implement the strategies outlined by the financial planning services of the trading system 100; however, the invention is not so limited. The present invention concerns electronic trades which are not driven or directed by the financial planning routines that may be offered by the trading system 100.

b. Trading Services with Automated Approvals

If trading services are selected at step 406, as determined at step 420, then the bond/security trading pages are accessed at step 422. From the trading pages, the customer can execute a street trade, a customer-to-customer trade, a team trade or some other trade for an SBD to execute. In accordance with a salient aspect of the invention, the customer's trades can be reviewed and approved automatically using an artificial intelligence routine which assesses the suitability of a trade for that particular customer. This aspect of the invention departs from conventional approaches wherein a principal must review and approve each trade prior to settlement; as far as the inventor is aware, this approach continues today in the Internet-based trading systems made available by E*Trade, Charles Schwab, Fidelity, and the rest, with back office staff reviewing each order and manually approving same. The conventional approach flows from longstanding securities industry regulations which require that the firm through which the trade is made ensure that the customer's investing activity is suitable for that customer based upon the customer's financial situation.

Figure 12:
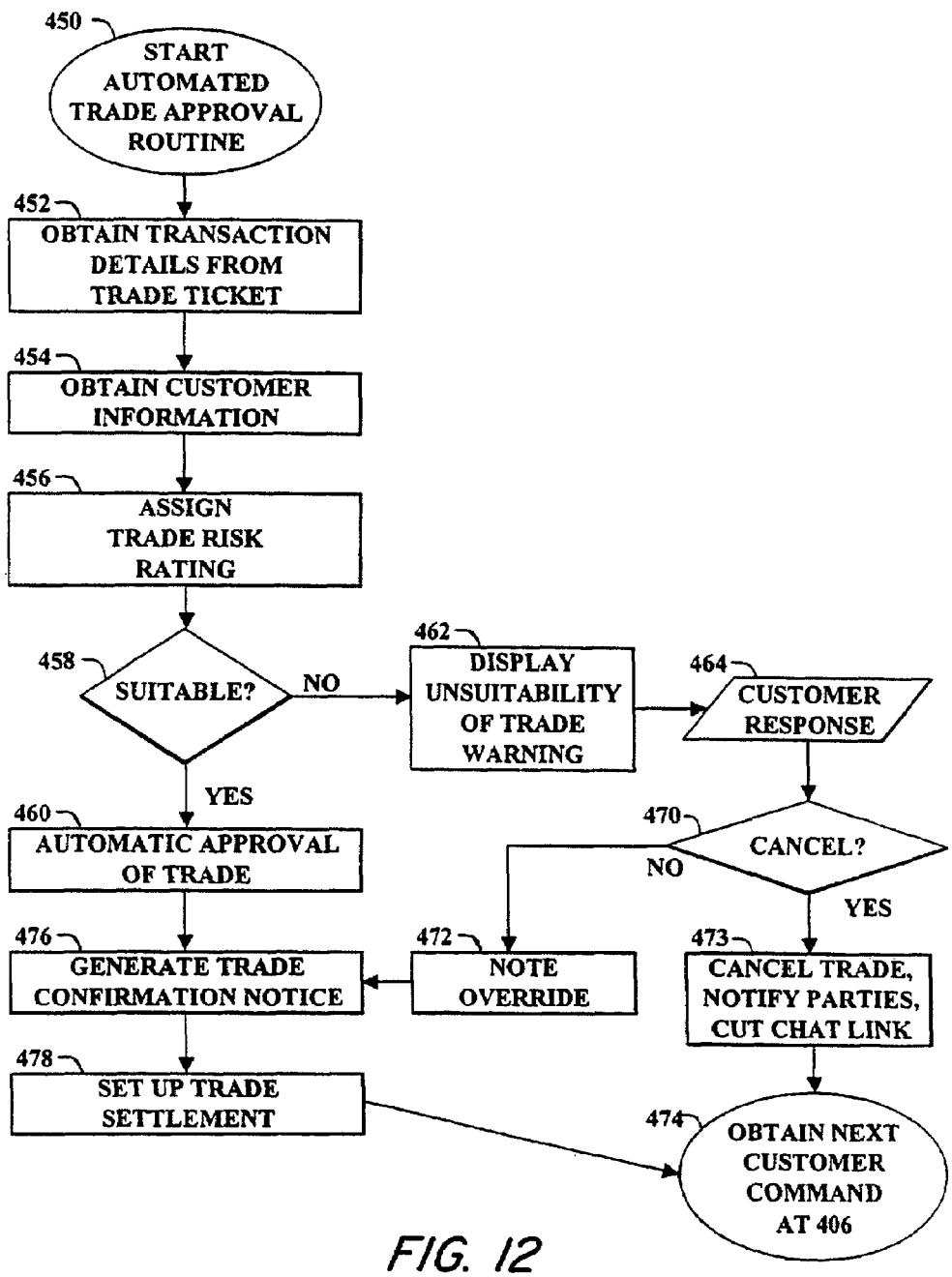
FIG. 12 is a flow diagram for automated trade approval of trades of financial instruments and investment packages that is provided by the system of FIG. 1 in accordance with a further aspect of the invention.

The suitability of a trade for a given customer is gauged relative to the risk rating that is assigned to that customer when he or she establishes an account (see step 323 of FIG. 6). An automated trade approval routine determines the suitability of the trade for a particular customer. With reference to FIG. 12, the automated trade approval routine starts at step 450. The system 100 obtains the transaction details of the proposed trade from the trade ticket or other electronic form that is completed by the customer at step 452. The transaction details include all of the information entered into the trade ticket by the customer. The trade ticket identifies the customer, and that customer's CRR and other relevant information is obtainable from the database 118 at step 454.

The suitability of the proposed trade is rated at step 456 for both the buyer and seller. Whether a trade is suitable or not is rated by applying a series of analyses. Each analysis explores the underlying economic risks of the instrument itself or the nature of the trade within the overall context of the customer's risk profile (which is reflected in the CRR). After final analysis, the trade is assigned a "Trade Risk Rating" or "TRR" which is compared directly with the CRR to provide a "Yes" or "No" suitability determination at step 458.

Obtaining a meaningful TRR requires at least two sequential analyses. The first analysis is a qualitative judgment as to whether the type of trade or investment (with no consideration of the specific instrument to be bought or sold) is suitable for the type of account which the customer holds (with no consideration to the financial resources or expertise of the customer). For example, a proposed short sale in a retirement account would be deemed unsuitable regardless of the instrument being sold or the wealth of the customer, since uncovered short sales are speculative trades and any trade considered speculative is generally not suitable for a tax-deferred retirement account. Rejection of a trade as unsuitable at this first step will depend on regulations set by regulatory authorities, the legal documents governing the account, and policies set by the SBD or system operator. The qualitative analysis is performed using a set of rules in a rule base or a look-up table including, among other rules, a no-uncovered-short-sale-in-retirement-account rule. A series of such rules is established and referenced to determine as a threshold matter whether a trade can be done in the specified account.

If a trade passes the first analysis, it is then subjected to a quantitative test which compares the Value-At-Risk ("VAR") of the trade to the financial resources of the customer. VAR is the potential loss that might occur, after the trade is settled, if the market moves in an adverse manner. VAR calculations are well-known in the art and are a standard means of quantifying potential trading loss. The VAR's magnitude is customer independent and is compared to the specific customer's financial resources (e.g., income, liquid net worth, total net worth) to determine a TRR value for that customer. Based on preset threshold triggers, the trade is assigned a TRR, where "1" represents the greatest risk of potential harm to wealth and "3" the least risk. The TRR can be refined to take into account other relevant factors, such as the maturity of the bonds versus the customer's stated investment horizon, the outlook for improvement/deterioration of a bond issuer's credit, etc.

After the TRR is determined, it is compared to the CRR for both the buyer and seller (step 458). The TRR is gauged to the risk rating that was assigned to the particular customer who is seeking approval for the trade. At step 458, the gauge is preferably whether CRR is ≦TRR, although other predetermined relationships can be used. In the automated trade approval routine of FIG. 12, if the customer risk rating is less than or equal to the determined trade risk rating, then the trade can be automatically approved at step 460. Otherwise, the details in the proposed trade ticket trigger an unsuitability warning in the form of a pop-up dialog box, web page, or the like which is displayed to the customer, as at step 462. The warning can advise the customer of the potentially high market risk, potential impact on the customer's investment portfolio or other warning.

| Customer Risk Rating | Trade Risk Rating | Unsuitability Warning |
| --- | --- | --- |
| 3 | 3 | No (automatic trade approval) |
| 3 | 1 or 2 | Yes |
| 2 | 3 or 2 | No (automatic trade approval) |
| 2 | 1 | Yes |
| 1 | 1, 2 or 3 | No (automatic trade approval) |
| R,X | 3 | No (automatic trade approval) |
| R,X | 1 or 2 | Yes |

The trade is deemed suitable if the CRR is less than or equal to the TRR (i.e., the customer's ability to withstand risk is greater than the risk associated with the trade). If the trade is suitable for both the buyer and seller it is approved at step 460. Trade confirmation notices are provided to the buyer, seller, and their SBDs (step 476), and trade settlement is scheduled by the system at step 478.

If the trade is deemed unsuitable for one of the parties at step 458, he is alerted to this fact at step 462 with details as to why the trade was deemed unsuitable. Each party is not made aware of any unsuitability determination associated with the other party at this stage.

At step 464, the customer enters a response to the unsuitability warning. The customer can accept the trade as is or cancel it. If the customer elects to accept the trade as is at step 470, despite the unsuitability warning, the customer's having overridden the warning is noted on the trade ticket at step 472. In limited circumstances, a separate confirmation may be required to approve a proposed trade with an unusually high amount of risk. If the customer wishes to cancel the trade as a result of the warning, he or she enters that response at step 464. At step 473, a trade cancellation notice is sent to the other party, the anonymous chat/communication link is terminated, and the trade is canceled. The customer is then returned at step 474 to the customer command input at step 406 of FIG. 7.

In the event that the proposed trade was automatically approved at step 460 or the unsuitability warning was overridden at step 464 (with that fact noted at step 472), the process flow continues by generating a trade confirmation notice at step 476 and the trade is set up for settlement at step 478. Trade settlement includes an exchange of cash and securities between the buyer and seller, a charge of a commission to both, and a credit of a commission to any SBD that was involved in the trade. The process flow then goes to step 474 to display on the customer's web browser the customer command input at step 406 of FIG. 7.

Figure 8:
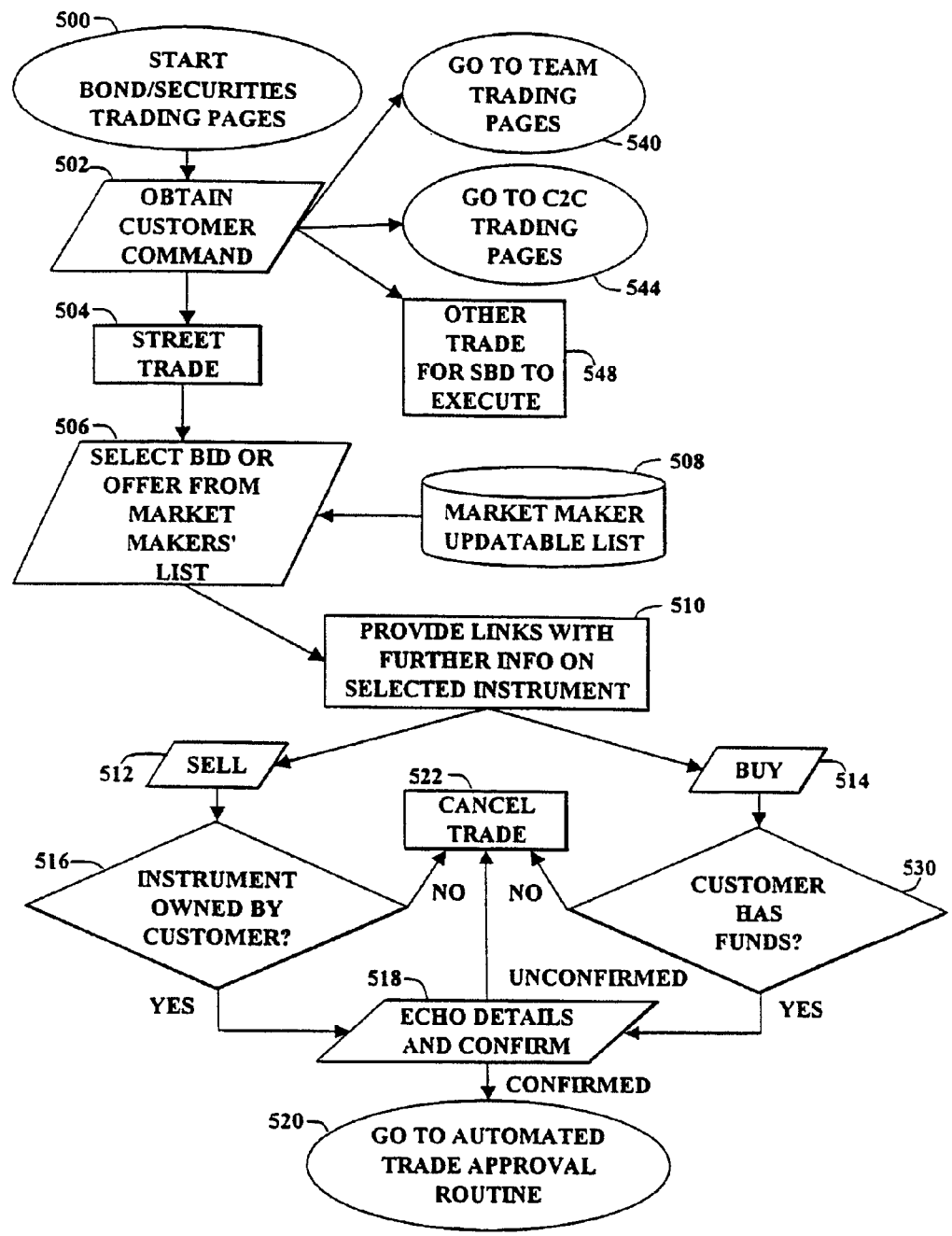
FIG. 8 is a flow diagram for trading pages including street trades provided by and executable through the system of FIG. 1.

With reference now to FIG. 8, links to several different trading pages are displayed at the main trading page menu, step 500. Depending on the command input by customer at step 502, the trading pages for either a street trade, a customer-to-customer trade, a team trade or some other trade for an SBD to execute are called up and displayed on the customer's web browser. These trading pages are described in turn.

i. Street Trade Trading Pages

If the customer selected the street trade trading pages, as determined at step 504, then various market makers' lists of instruments (e.g., bonds), their price, maturity date, interest rate, coupons, etc. are displayed on the customer's web browser application. The lists are maintained and are available to the system 100 from a data store 508. Accompanying each listing is further information such as the credit history of the issuer and other disclosure documents that may be pertinent to an investment decision, all of which are retrievable electronically through the web browser using links 510. The links are provided to the customer after a selection has been made from the market makers' lists. The customer can sell or buy the selected instrument at steps 512 and 514, respectively, by completing a trade ticket form displayed on his or her web browser and posting it to the system 100. The transaction details are extractable (that is, can be obtained) from the trade ticket form as digital data.

Prior to setting up and executing any trade, the system 100 reviews the transaction details in the trade ticket form and seeks confirmation of the trade from the customer. If the trade is a sale of a particular instrument, the customer must own the instrument, as determined at step 516, and if he owns the instrument, the details of the proposed sales transaction are echoed to the customer for confirmation at step 518. On the other hand, if the customer is seeking to purchase a particular instrument, as determined at step 514, the system 100 determines whether the customer has sufficient funds to do so at step 530, and, if so, the transaction details are presented to the customer for confirmation, at step 518. If the customer confirms the transaction, then the risks attendant with the proposed trade and the suitability of the proposed trade for that customer are determined using the automated trade approval routine of FIG. 12. As described above, the proposed trade may be automatically approved if it is "suitable" for the customer or may require a customer response to an "unsuitability warning" prior to executing the trade.

As can be appreciated from FIG. 8, if: (a) the customer does not own the instrument that he or she proposes to sell at step 512; (b) does not have sufficient funds to buy the proposed instrument at step 514; or (c) declines to confirm the transaction details at step 518, then the trade is canceled at step 522. In any of these circumstances, the trading/services page is redisplayed.

ii. Team Trade Trading Pages

From the main trading menu (step 500), the team trade trading pages may be selected at step 502, as determined and called up onto the customer's web browser at step 540. Team trading, in accordance with an aspect of the present invention, permits individual investors to aggregate their respective buy or sell orders for execution as a single order of a given quantity of a common financial instrument or investment package. An "investment package" may include one or more financial instruments, including different types of instruments such as stocks and bonds which are grouped to satisfy an investment goal of the team.

Necessarily, the team members must share an investment goal and agree to a common investment vehicle. The team trading pages enable this by bringing together investors with common interests and permitting them to exchange ideas and obtain system-provided information relevant to their investment goal, such as, for example, specific bonds which according to present market conditions satisfy the goal. Team trading provides an alternative to buying or selling from a dealer, and each team member owns the instruments that are purchased and retains management control over the investment, rather than owning a share of an investment which may be actively managed by someone else or not managed at all. Moreover, the fixed transaction costs associated with the team order are far less than would have been incurred were the individual orders processed separately and are shared by the team members, thus improving the economics to the individual investors. A further advantage of a team order is that it is more apt to obtain a better price as a single large order rather than as many small orders.

Figure 9:
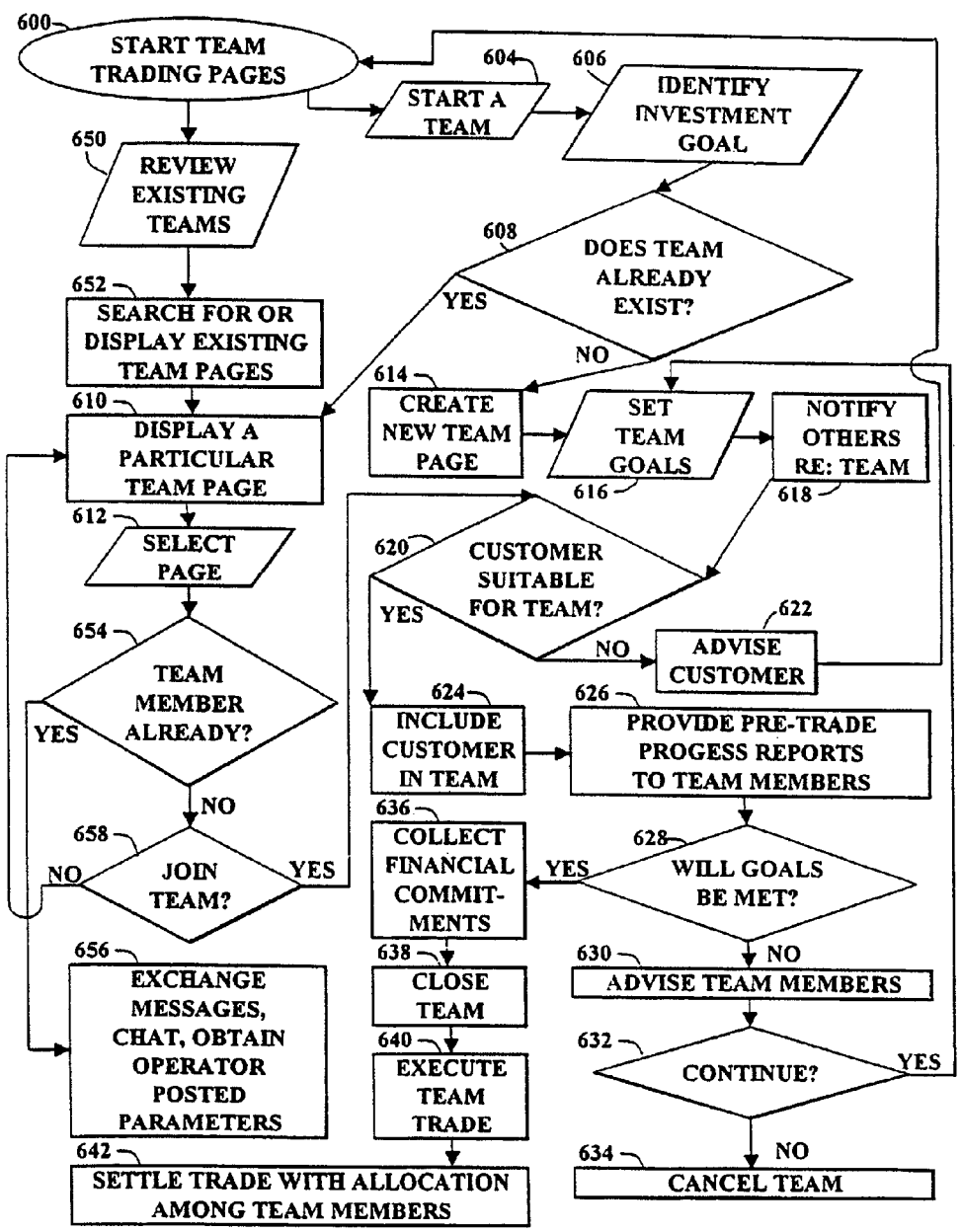
FIG. 9 is a flow diagram of team trading pages that are provided by the system of FIG. 1 in accordance with one aspect of the invention.

With reference now to FIG. 9, the team trading pages are displayed at step 600. The team trading pages constitute a number of pages, and the customer is presented with different pages depending on what he or she wants to do. The basic choice that must first be made is whether to start a new team or review existing teams and perhaps join and participate in them.

a. Starting a Team

A customer starts a team by entering a start-team command at step 604 and thereafter completing a team-start form at step 606. The team-start form specifies, generally, the investment goal that the customer has in mind. The form guides the format of data entry and solicits information such as: the type of issuer (e.g., household name corporation or municipality), the credit quality (e.g., AAA or AA.), the maturity (e.g., 1 or 5 years), and the purpose of the investment (e.g., college education or retirement).

The system operator will establish a team page using the information if there do not already exist team pages which address the customer's stated investment goal, as determined at step 608. In other words, if a need for an additional team is confirmed, then a new team page is created at step 614. Because a number of team pages are provided by the system, each having its own investment goal and investment package (which may comprise only one financial instrument), the customer may be better served by being directed to an existing team, as at step 610, than to be the sole member of a new team. The determination at step 608 causes fewer teams to be created and better ensures that the existing teams are filled.

Upon creating the new team web page, the system processes the information in the team-start form in view of current market conditions and posts on the team web page the specific instruments which can be purchased in order to reach the investment goal at step 616. For example, a ten-year protect-principal growth strategy might be best satisfied by a portfolio consisting of 70% 7–10 year A-rated bonds and 30% blue-chip stocks. Preferably, the investment goals are determined automatically and without user intervention. However, a financial advisory professional may review the investment goal and post his or her suggestions at step 616 on the team web page, as a service provided by the firm operating the system 100. Optionally, the customer can request such guidance by selecting such a feature in the team-start form.

Other customers of the system 100 are notified of the new team at step 618, for example, by email, by a banner notice to all customers upon logging on to the system, or simply by including the new team web page for display along with the other team web pages (see step 652).

The customer starting, or any other customers joining, a new team may not be a suitable candidate to participate in the team. At step 620, the system determines whether the customer has the finances or risk tolerance required for the type of investments that are required to satisfy the team goal. This is done by reviewing the CRR and comparing it to the TRR which is determined for the specific instruments required to meet the investment goal, as described above in connection with step 456 of FIG. 12. The suitability test may be as at step 458 of FIG. 12. If the customer is not suitable for the new team, the customer is so advised at step 622 and the process flow goes back to the main team trading page (step 600). If there are no other team members, the system may eliminate the newly created team or keep it and display the team along with the other team web pages. If the customer is suitable for the new team, he or she is included at step 624 and will thereafter receive pre-trade progress reports at step 626 regarding team issues such as: new members, tentative financial commitments to date, proximity to reaching an institutional-sized round lot, etc.

From time to time, the system determines at step 628 whether the goals of the team will be met. For example, the goal may include trading by a particular date which does not appear likely due to lack of team members or financial commitment. Because market conditions fluctuate and a team may be undersubscribed by a trade date, the creation of the team at step 614 does not mean that the team will be able to execute a team trade.

If it turns out that the team goals will not be met, then the team members are advised of this (step 630) and they must confirm that they wish to continue (step 632). If the team is to continue, then the team goals are revised at step 616 using updated parameters and analysis by the system 100 and/or financial advisory professional in view of any changes in market conditions. On the other hand, if the team members do not wish to continue with the team, then at step 634 the team is canceled.

As the trade date approaches and the team goals can be met (as determined at step 628), then the final financial commitments of the team members are obtained or collected at step 636 to aggregate sufficient funds to implement a single larger trade, preferably an institutional-sized round lot trade. Each customer can specify his or her investment in terms of total amount of dollars to be invested (which may result in the ownership of fractional bonds) or in terms of face amount of whole bonds. Each customer specifies his or her respective commitment by posting that commitment to the system, for example, in response to a notice from the system that financial commitments are now required to participate in the team trade. Once a commitment is made and a team trade has not been aborted, the customer's committed funds are unavailable for other use. Preferably, a team is fully subscribed when at least an institutional-sized order is achieved. An over-subscribed team may be cut-back to a predetermined size on a first-come-first served basis; however, a team can be cut-back on a pro-rata basis to reduce the investment amount to a targeted investment amount. Alternatively, the target can be raised to accommodate the demand for that team investment.

Thereafter, at step 638, the team is closed and the trade executed, at step 640. Once the trade has been executed, it is settled by allocating the ownership and cost among the team members, at step 642. For a bond purchase, funds are taken from each team member's accounts in an amount up to his or her respective financial commitment (plus, perhaps, an additional amount for commissions), and a number of financial instruments, including any fractional portions, are allocated to each team member's account in a proportionate share of the quantity of financial instrument(s) that was just purchased. The proportionate share of the quantity purchased is the amount charged to each customer divided by the total cost for the trade, exclusive of commissions. Because each customer now owns the financial instruments that were purchased, the team has no further purpose, and each customer can retain or sell the instruments at his or her own discretion. For a team bond sale, an analogous process occurs.

It should be understood that the time between creating a team at step 614 and a team trade being executed at step 640 is on the order of one or two days up to about two weeks. If financial commitments are made but the trade is not executed by a settlement date, for example, the commitment is discharged and the funds in the customer's account will then be available for other use. Alternatively, funds are restricted only when a customer is given notice that the trade is to be executed.

b. Joining and Participating in an Existing Team

From the main team trading page 600, customers can review a list of existing teams to find one of interest by entering the review-existing-teams command at step 650. This command displays at the customer's web browser a list of existing teams at step 652. In addition, the customer may enter a search query to search for a particular team using a standard website search engine. Once a team page of interest has been located in the list, it is displayed at step 610. The customer interacts with the team page by selecting it at step 612. The system determines at step 654 whether the customer is a member of the team already, and, if so, the customer may exchange messages, chat or obtain updated parameters that may be posted from time-to-time by the system operator, at step 656. Through the team web page, team members exchange ideas, discuss important topics and debate differences of opinion prior to making a team trade. The forum provided at the web page fosters a sense of community among the team members and better ensures that the members are all striving for a common investment goal.

If the customer is not a team member already, he or she can request to join the team at step 658, and will be joined if suitable, as determined at step 620, or advised that he or she cannot join, at step 622, as described above. If the customer is included in the team at step 624, the process flow continues from that step as previously described. Specifically, he or she will be provided with pre-trade progress reports, including whether the goals will be met, and if so, financial commitments will be collected so that the trade can be executed.

iii. Customer to Customer ("C2C") Trading Pages

From the main trading menu 500, the customer can also select customer-to-customer (C2C) trading pages at step 502. In response, the system 100 directs the customer to the C2C trading pages at step 544. In accordance with this aspect of the invention, one customer trades directly with another for the instrument that he or she wishes to purchase or sell without an intermediate broker. This direct customer-to-customer trading is done anonymously to maintain customer privacy. When coupled with the automated trade approval routine, customers can directly trade with one another through the system 100 without any human intervention in the transaction, thereby reducing commission charges and fees.

Figure 10:
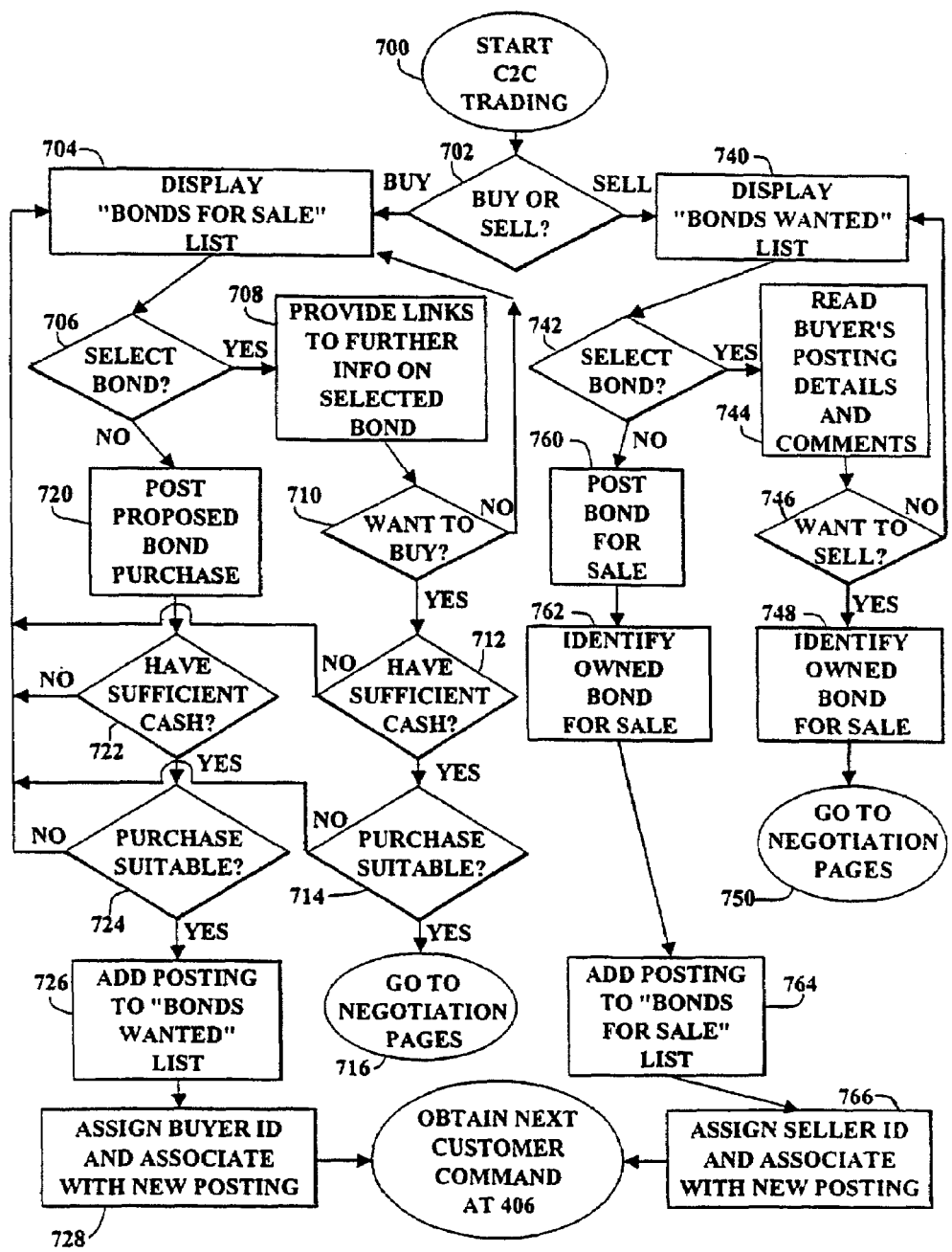
FIG. 10 is a flow diagram of customer-to-customer trading pages that are provided by the system of FIG. 1 in accordance with another aspect of the invention.

With reference now to FIG. 10, the C2C trading pages are displayed on the customer's web browser at step 700. The C2C trading pages are described in the context of bond trading, but it should be understood that the C2C concept applies to trading of other financial instruments such as stocks, stock options and other financial and derivative instruments. Also, customers can be individuals, institutions, or brokers. Further, fractional bonds or portions of other financial instruments may be bought and sold through the C2C trading pages.

The C2C trading pages of FIG. 10 include "bonds for sale" lists and "bonds wanted" lists. The "bonds for sale" list includes a list of those bonds that are held by a customer which are available for direct sale to another customer. The "bonds wanted" list includes those bonds, or types of bonds, that particular customers are interested in purchasing.

At step 702, a customer elects to either buy or sell a bond. The "bonds for sale" list is displayed at step 704 if the customer has elected to buy a bond. At step 706, the customer either purchases a bond selected from the "bonds for sale" list, or posts a bond that he or she wants to purchase. Prior to purchasing a bond that has been "listed" by another customer, links are displayed at step 708 to further information concerning the selected bond. After reviewing that information, the customer must confirm his or her desire to make the purchase, at step 710. If the customer decides not to purchase that bond, the "bonds for sale" list is again displayed (step 704); otherwise, the customer qualifications for negotiating the trade with the customer who listed the bond (the "listing customer") is determined. Specifically, the system 100 confirms that the buy-side customer has sufficient funds at step 712 by examining the customer's account to determine how much cash is available, and perhaps how much credit can be extended in any associated margin account. The system also confirms that the purchase is suitable for that customer at step 714 by examining the customer's ability to withstand the potential loss of principal inherent in the investment, substantially as described above in connection with steps 454 through 458 of FIG. 12. If the customer can afford the trade and tolerate the risk, the negotiation pages are called up at step 716. The negotiation pages are described below in connection with FIG. 11. However, if either of the tests at steps 712 and 714 fails, the "bonds for sale" list is again displayed to the customer so that a different selection can be made.

It may be that the customer reviewing the "bonds for sale" list does not find a listed bond of interest. In that case, the C2C trading pages permit the customer to post the bond(s) he or she wants to purchase on a "bonds wanted" list. The bonds wanted list complements the bonds-for-sale list and creates demand for such bonds that otherwise may not exist in any current system. A bond is posted to the "bonds wanted" list at step 720 by completing a bonds-wanted form. Each entry in the "bonds wanted" list is generated in response to a customer having completed a bonds-wanted form at the client-side browser and submitting (posting) the form to the server 100. The server then updates the "bonds wanted" web page using the information in the completed form. Likewise, entries into the "bonds for sale" list are made by a prospective seller completing a bonds-for-sale form, as described below.

Prior to updating the "bonds wanted" list, the system 100 confirms that the customer submitting the form has sufficient cash and is a suitable purchaser at steps 722 and 724, substantially as described above in connection with step 712 and 714. If the proposed purchase transaction is beyond the means of or is not suitable for that customer, the proposed posting is canceled and the "bonds for sale" list is displayed again, at step 704. Otherwise, the posting is added to the "bonds wanted" list at step 726 and an ID is assigned to that customer and associated with the new posting at step 728. Thereafter, a next customer command is obtained at step 406 of FIG. 7, for example, to obtain other information, obtain financial planning services, or monitor or implement other trades.

As noted above, the customer can elect to sell a bond at step 702. In this case, the "bonds wanted" list is displayed at step 740 from which the seller selects and reviews a buyer's posting of a bond wanted to purchase. The prospective seller can select a listed bond wanted for purchase, at step 742, and review the details posted by the buyer as well as any comments that were provided, at step 744. The prospective seller makes a determination of whether to sell his or her bond(s) at step 746. If the seller decides that he does not want to sell his bond based on the buyer's posting, then the seller is returned to the display of the "bonds wanted" list at step 740. Otherwise, the seller identifies a bond in his portfolio at step 748 and the transaction proceeds to negotiation at step 750 (see FIG. 11).

Optionally, for any detailed listing in the "bonds wanted" list, the system 100 can determine whether any customer has the listed bond in his or her portfolio, and if so, can identify to the customer which listings in the "bonds wanted" list are in his or her portfolio. This may occur automatically or in response to a user request.

Alternatively, the prospective seller can add a bond from his or her portfolio to the "bonds for sale" list. By completing and submitting a bonds-for-sale form, the seller posts the bond on the "bonds for sale" list at step 760. The server then updates the bonds-for-sale web page. If the system 100 determines that the bond is owned by the sell-side customer at step 762, then the posting is added to the list at step 764 and is displayed to prospective purchasers who elect to "buy" bonds at step 702. In addition, the seller is assigned an ID at step 766 which is associated with the newly listed bond. Thereafter, the customer is returned to the command prompt at step 406 of FIG. 7.

It should be understood from the foregoing that prospective purchasers add to the "bonds wanted" list and prospective sellers add to the "bonds for sale" list by navigating the C2C trading pages in the manner described above and shown in FIG. 10.

Preferably, the identities of listing customer on the one hand and the prospective buyer or seller on the other hand are concealed. That is, buyers looking to buy a bond from the "bonds for sale" list and sellers looking to sell a bond listed on the "bonds wanted" list do not know each other's identities. Instead, the negotiation between the two customers proceeds anonymously, using identifiers that are assigned to the listing customer (at step 728 or step 766) and to the prospective buyer/seller at step 810 of FIG. 11, discussed next.

Figure 11:
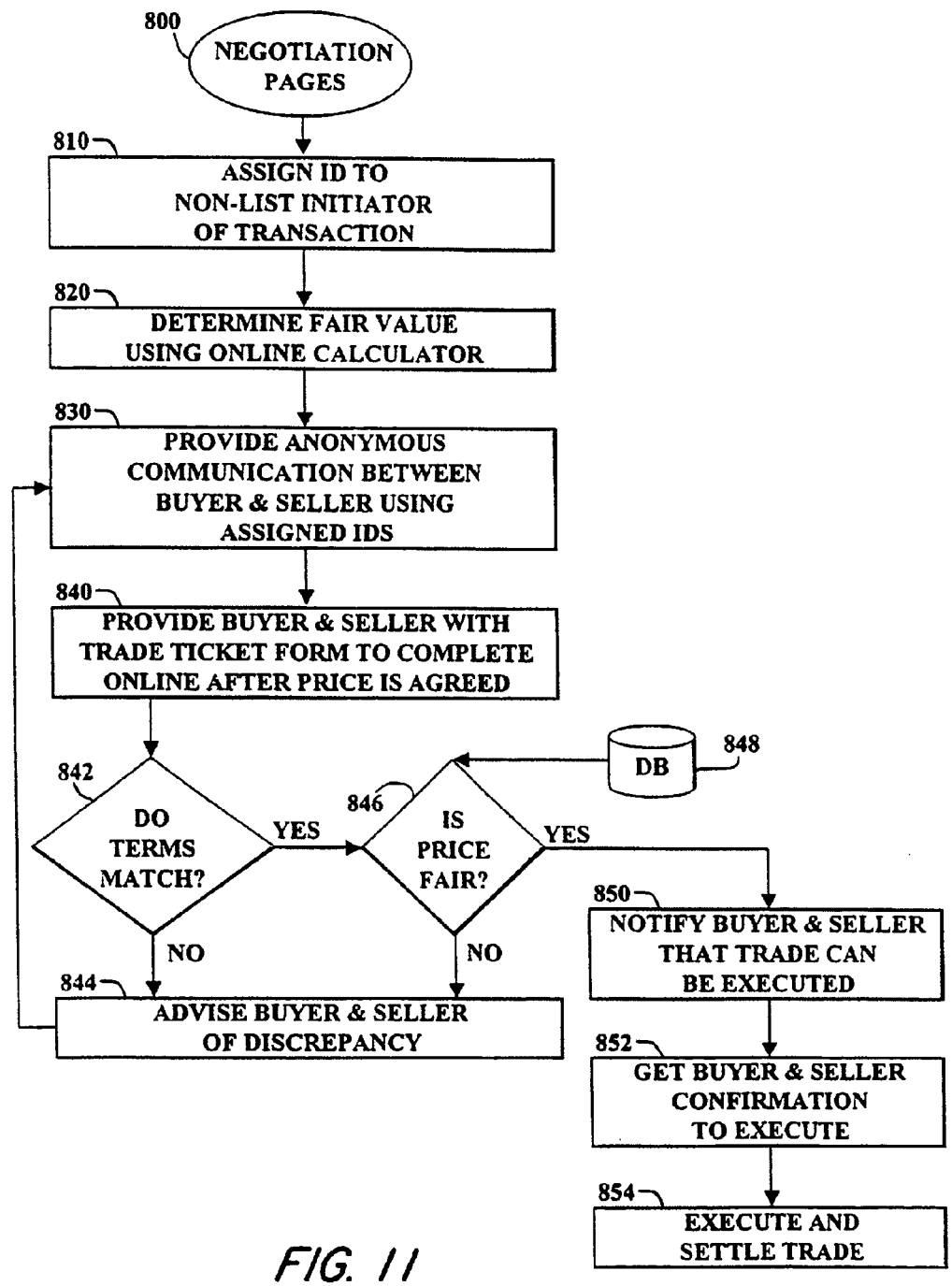
FIG. 11 is a flow diagram of negotiation pages that may be used by customers to implement the customer-to-customer trades of FIG. 10.

With reference now to FIG. 11, the negotiation pages are called up in response to a customer's interest in buying or selling a "listed" instrument, that is, a bond which is listed on the "bonds for sale" or "bonds wanted" lists. At step 810, the customer who is responding to a listed bond is assigned an ID for that transaction. The system 100 establishes a communication link (including an exchange of assigned IDs) between the two customers. In particular, if a customer is responding to a "bonds for sale" listing, then the ID is assigned to the prospective buyer (the "buy-side customer") and, if the customer is responding to a "bonds wanted" listing, then the ID is assigned to the prospective seller (the "sell-side customer"). At step 820, the fair value of the bond is determined by the system 100 using an online calculator. The fair value is reported to the two parties to the proposed trade as a base line comparison value to guide the customers to a fair trade. The fair value of the listed bond is calculated in light of the trade date, settlement date, accrued interest and appropriate Treasury yield.

At step 830, anonymous communication between the two customers, namely, the buyer and seller, proceeds on the Internet using the IDs that were assigned to them. The goal of the anonymous communication is to negotiate and ultimately agree upon price. The negotiations transpire within a secure portion of the system website. When each of the parties to the trade believes that they have come to an agreement, including an agreement as to price, then at step 840 the parties are provided with a trade ticket form to complete online. Each party submits (posts) his or her respective trade ticket form and the system determines at step 842 whether the terms from the two trade tickets match. If the tickets do not match, then the buyer and seller are advised of the discrepancy at step 844 and communications may again proceed as at step 830 to correct the discrepancy or cease negotiations.

If the terms do match, however, then, in accordance with a further aspect of the invention, the fairness of the agreed upon terms to both parties is assessed automatically and without manual intervention, at step 846. Specifically, the system 100 ensures that customer-to-customer trades are made at a "fair" price which is between bid and offer price quotes from odd lot dealers and third party services such as BondTrac and Bond Express dealing in the same or comparable bonds. That is, a "fair" price is one which falls between two objectively determinable limits. Such prices are what customers would experience if they were bought or sold outside the system 100 and is competitive with the traditional pricing that customers would be advised of when using a conventional dealer to handle their order. This objective measure protects the buyer from over-paying and the seller from excessive discounting, and is made by comparing the price in the completed trade ticket to the price quote from such dealers and/or third party services. Further, the system 100 encourages C2C trades to be made at a price which is similar to a price quote for the same or comparable bonds in institutional-sized round lots that can be received from institutional dealers or by monitoring new issuance levels and third party dealer screens (e.g., Telerate) which show the secondary institutional trading levels for actively traded bonds. Each of these comparisons and the determination of whether a price is fair at step 846 relies upon data from one or more information sources 848 that are connected to or accessed by the system 100. The term "comparable bond" as used herein refers to a bond which has similar characteristics such as type and credit quality of the issuer, maturity, interest rate, etc.

If the price is not deemed fair, then the buyer and seller are advised of this discrepancy at step 844 and the anonymous communications between the buyer and seller can again proceed at step 830. This mechanism ensures that one customer does not take advantage of another in a direct trade. However, if the price is determined to be fair (or if buyer and seller both agree to the negotiated price), then at step 850 the buyer and seller are notified that the trade can be executed and the system obtains the confirmation from both that the trade is to be executed in accordance with the trade tickets at step 852. Thereafter, the trade may be executed and subsequently settled as at step 854 in a conventional manner, or execution and trade settlement may include the automated trade approval routine of FIG. 12.

c. Other Services

In addition to the financial planning services and trading web sites, the customer can select other functions and services by entering a suitable command at step 406, as shown at step 424, such as bond calculators and IRA analyzers. These other services are not material to the present invention and are thus not described in detail.

3. Data Entry Forms

Various forms are used in the process flows and methods of the present invention, including a trade details form, a team-start form, a bonds-wanted form, and a bonds-for-sale form. Exemplary forms for entering this information and web pages are shown in FIGS. 13 through 20.

With reference first to FIG. 13, the transaction details of a completed trade made by a purchasing customer are listed in the illustrated trade ticket. The transaction details in the trade ticket are conveyed to the customer over the Internet in any conventional secure manner. The transaction details may include many or all of the following: the trade number 1002 (which is common to the buy and sell sides of the transaction and generated by the system for tracking and internal audit purposes), the buying customer's account number 1004, the status of the trade 1006 (filled, partially filled, open, pending cancellation, etc.), which side of the transaction the customer was on 1008 (buy or sell side), the amount of the instrument purchased 1010, the name of the instrument 1012, the type of the instrument 1014 (bond, stock, option), the CUSIP number 1016 for that instrument, the execution method 1018 (e.g., street trade, C2C, team trade), conditions on the trade 1020 (market order, limit order) and values 1022, 1024 on the conditions (e.g. price or time limits), the time of the order 1026, the trade date 1028, the settlement date 1030, the price 1032, the accrued interest 1034, if any, the gross amount of the trade 1036, the commission 1038, any SEC fee 1040, any tax 1042, any further service charge 1044, the net amount of the transaction 1046, the market in which the trade was executed 1048 (e.g., C2C, NASDAQ, NYSE, etc.), and the SBD that was involved in the trade 1050. Depending on the security type 1014, some of the fields in the trade ticket may be empty or not provided to the customer because they are not relevant (e.g., there is no accrued interest in a purchase or sale of stock).

In FIG. 14, an exemplary "team investing" web page 1100 is displayed, such as is displayed at step 600. A selection of teams are available in an active teams list 1102, for the customer to choose from. The active teams list in FIG. 14 includes one active team, team number T01123 called "The Broke Parents Club." The active teams list includes data fields which identify for each team the team's investment goal 1104, the number of members the team currently has 1106, the extent of current commitments 1108, and the target date for the trade 1110. Further information on each team can be obtained by click-selecting the team, for example, by clicking on the team name field 1112 for a particular team. The customer can also start a new team by clicking hyperlinked-text such as the "Click here to Start a New Team" text 1114.

If the customer wishes to start a new team, then the team-start form referred to above at step 606 is displayed at the customer's computer, that is in his or her browser or application software. An exemplary team-start form 1200 is illustrated in FIG. 15 and provides various fields in which customers name the proposed team 1202, define the action of the team (to buy or sell or implement a particular strategy) 1204, define the team goal field 1206, define their financial commitment 1208, state a trade date 1210, and provide customer identifying information 1212. The team-start form 1200 can be cleared using button 1214 or submitted using button 1216.

In connection with customer-to-customer trading, bonds-wanted and bonds-for-sale lists are displayed to customers from which a bond can be selected for trading. If the bond is not included on one of these lists, a "bonds wanted" or "bonds for sale" notice can be posted by a customer for inclusion in the appropriate list.

With reference now to FIG. 16, the display of the "bonds for sale" list, as referred to above at step 704, may comprise a display such as the web page 1300. One or more bonds for sale are listed in a table which identifies, among other information, the issuer 1302, the amount 1304, the rating 1306, coupon 1308, maturity 1310, call date 1312, call price 1314, and the seller by way of an encoded identifier 1316 known only to the system operator. A customer interested in purchasing a bond listed on the bonds for sale web page 1300 clicks the seller's identifier 1316 to begin negotiations. Of course, any row entry in the bonds for sale list can be click-selected to initiate negotiations, and negotiations proceed after the process steps of FIG. 10 described above. In the event that the customer does not see a bond that he or she wishes to buy from the list, a "bonds wanted" notice can be posted by clicking a button or hypertext-link, such as the hypertext 1318.

In like manner, the "bonds wanted" list referred to above at step 740, may comprise a display such as the web page 1400 of FIG. 17. One or more bonds wanted are listed in a table which identifies, among other information, the issuer 1402, the amount 1404, a rating range 1406, a coupon range 1408, a maturity range 1410, whether the bond is callable 1412, and the buyer by way of an encoded identifier 1416 known only to the system operator. A customer interested in selling a bond which is listed on the bonds wanted web page 1400 clicks the buyer's identifier 1416 or another row entry to begin negotiations, with negotiations proceeding as described in connection with FIG. 10. In the event that the customer does not see a bond that he or she wishes to buy from the list, a "bonds for sale" notice can be posted by clicking a button or hypertext-link, such as the hypertext 1418.

FIG. 18 illustrates an exemplary "bonds for sale" form 1500 which includes fields 1502–1516 that correspond to fields 1302–1316, respectively. The seller-id field 1516 obtains the selling customer's name, account number and e-mail address, but none of this information is posted in the seller-ID field 1316. Instead, as described at step 766, a seller-ID is assigned and included in the seller-ID field 1316. Erroneous entries can be cleared using a reset button 1518, and the bonds-for-sale form 1500 is submitted using a post form button 1520.

FIG. 19 illustrates an exemplary "bonds wanted" form 1600 which includes fields 1602–1616 that correspond to fields 1402–1416, respectively. The buyer-ID field 1616 obtains the buying customer's name, account number and e-mail address, but none of this information is posted in the buyer-ID field 1416. Instead, as described at step 728, a buyer-ID is assigned and included in the buyer-ID field 1416. Erroneous entries can be cleared using a reset button 1618, and the bonds-wanted form 1600 is submitted using a post form button 1620.

FIG. 20 illustrates an order form by which the customer enters information to execute a trade, for example, a street trade, a customer to customer trade, or a team trade. For C2C and team trades, the customer is assigned a coded identifier, as described above. The order form includes standard fields which form no part of the present invention. The actual fields that are provided to the customer may be tailored to the specific type of transaction to be made. Thus, for example, only fields related to bonds are displayed if the customer has entered the bond trading pages.

Briefly, the form 1700 may include one or more of the following fields, which may require data to be typed in or a button switch to be set: customer account number 1704, the side of the transaction 1708, the amount to be spent 1710, whether the customer will accept less, any minimum amount and increment 1711a, 1711b, and 1711c, respectively, the type of instrument to be traded 1714, the price 1720, and any limits on price 1722, including a stop price 1723, and any limits on time 1724. Depending on whether the instrument to be traded is a bond, stock or stock option, further information is provided into the order form to identify the bond or security to be traded: coupon, callability, etc. if a bond; and the strike price and strike date if an option, as shown in FIG. 20.

Many of the web sites and processes require secure communications between the server 100 and the customer 106, 116. This is achieved in a conventional manner by providing a secure socket layer (SSL) connection between the customer's web browser and the server 100. If an SBD 110 is interposed between the customer 116 and the server 100, than the SSL connection extends from the customer 116, through the SBD, to the server 100.

The principles of the present invention apply to various financial markets other than the bond markets, the presently preferred application. For example, the invention can be used to facilitate trades in stock, option, commodity and derivatives markets to automate trade approvals, execute C2C transactions, perform group trades and implement other features described above. To implement the invention in other markets, regulatory requirements may demand that further steps be taken such as reporting trades in a timely manner or routing trades to the appropriate exchange (e.g., to the commodities exchange that handles a particular commodities trade); however, such steps form no part of the present invention.

The present invention, therefore, provides a bond trading system which permits individuals to own bonds directly through a cost effective trading system, which makes short-term bonds an attractive alternative to cash-on-hand for the individual investor, and which provides an expert system for effectuating automated trade approvals for each trade of each individual investor.

While the invention has been described in detail with particular reference to certain embodiments thereof, the invention is capable of different embodiments and its details are capable of modifications in various obvious respects. As would be readily apparent to those skilled in the art, variations and modifications can be affected while remaining within the spirit and scope of the invention. Accordingly, the foregoing disclosure, description, and Figures are for illustrative purposes only, and do not in any way limit the invention, which is defined only by the claims.

What is claimed is:

1. A system for facilitating securities trading comprising:
   a computer;
   a trader rules database accessible by said computer;
   a set of trader risk assessment rules stored on said trader rules database;
   software executing on said computer for receiving trader information from a trader, for retrieving said set of trader risk assessment rules from said trader rules database, and for assigning a trader risk rating to the trader based upon the received trader information and said set of trader risk assessment rules;
   a trade rules database accessible by said computer;
   a set of trade risk assessment rules stored on said trade rules database;
   software executing on said computer for receiving trade details from a trader for a proposed trade, for retrieving said set of trade risk assessment rules from said trade rules database, and for assigning a trade risk rating to the proposed trade based upon the received trade details and said set of trade risk assessment rules; and
   software executing on said computer for automatically approving the proposed trade if the trader risk rating and the trade risk rating bear a predetermined relationship to one another.

2. The system for facilitating securities trading of claim 1 wherein the trader risk rating and the trade risk rating comprise numerical indications of associated risk.

3. The system for facilitating securities trading of claim 2 wherein the predetermined relationship between the trader risk rating and the trade risk rating for receiving automatic approval of the proposed trade is that the trader risk rating be no greater than the trade risk rating.

4. The system for facilitating securities trading of claim 1 wherein the system determines the trader risk rating, and evaluates the relationship between the trader risk rating and the trade risk rating, for each party to the proposed trade.

5. The system for facilitating securities trading of claim 1 further comprising:
   a trader risk rating database accessible by said computer; and
   software executing on said computer for storing the trader risk rating assigned to the trader, and for retrieving that stored trader risk rating for the trader each time that trader attempts to participate in a trade.

6. The system for facilitating securities trading of claim 1 wherein the trader risk rating is indicative of the financial resources of and the investment experience of the trader.

7. The system for facilitating securities trading of claim 1 wherein the trade risk rating is indicative of the underlying economic risks associated with an instrument which is the subject of the proposed trade.

8. The system for facilitating securities trading of claim 1 further comprising:
   software executing on said computer for automatically generating and transmitting to the trader a warning regarding the proposed trade if the trader risk rating and the trade risk rating do not bear a predetermined relationship to one another; and
   software executing on said computer for automatically approving the proposed trade if an override indication is received from the trader.

9. A method for facilitating securities trading comprising the steps of:
   providing a computer;
   providing a trader rules database accessible by the computer;
   storing a set of trader risk assessment rules on the trader rules database;
   receiving trader information from a trader, retrieving the set of trader risk assessment rules from the trader rules database, and assigning a trader risk rating to the trader based upon the received trader information and the set of trader risk assessment rules;
   providing a trade rules database accessible by the computer;
   storing a set of trade risk assessment rules on the trade rules database;
   receiving trade details from a trader for a proposed trade, retrieving the set of trade risk assessment rules from the trade rules database, and assigning a trade risk rating to the proposed trade based upon the received trade details and the set of trade risk assessment rules; and
   automatically approving the proposed trade if the trader risk rating and the trade risk rating bear a predetermined relationship to one another.

10. The method for facilitating securities trading of claim 9 wherein:
    the trader risk rating and the trade risk rating comprise numerical values representing associated risk;
    and said step of automatically approving the proposed trade comprises automatically approving the proposed trade if the trader risk rating is no greater than the trade risk rating.

11. The method for facilitating securities trading of claim 9 wherein the trader risk rating is determined, and the relationship between the trader risk rating and the trade risk rating is evaluated, for each party to the proposed trade.

12. The method for facilitating securities trading of claim 9 further comprising the steps of:
    providing a trader risk rating database accessible by the computer; and
    storing the trader risk rating assigned to the trader on the trader risk rating database; and
    retrieving the stored trader risk rating for the trader each time that trader attempts to participate in a trade, such that the trader risk rating for each trader must only be assigned once.

13. The method for facilitating securities trading of claim 9 further comprising the steps of:
    automatically generating and transmitting to the trader a warning regarding the proposed trade if the trader risk rating and the trade risk rating do not bear a predetermined relationship to one another; and
    automatically approving the proposed trade if an override indication is received from the trader.

14. A system for facilitating securities trading comprising:
    a computer;
    a trader rules database accessible by said computer;
    a set of trader risk assessment rules stored on said trader rules database;
    software executing on said computer for receiving trader information from a trader, for retrieving said set of trader risk assessment rules from said trader rules database, and for assigning a trader risk rating to the trader based upon the received trader information and said set of trader risk assessment rules;

a trader risk rating database accessible by said computer; and software executing on said computer for storing the trader risk rating assigned to the trader on said trader risk rating database;

software executing on said computer for receiving trade details from a trader for a proposed trade and for automatically approving the proposed trade if the trader risk rating is below a risk threshold for the proposed trade.

15. The system for facilitating securities trading of claim 14 wherein the system determines the trader risk rating and automatically approves the proposed trade for each party to the proposed trade.

16. The system for facilitating securities trading of claim 14 further comprising software executing on said computer for retrieving the stored trader risk rating stored on said trader risk rating database for the trader each time that trader attempts to participate in a trade, such that the trader risk rating for each trader must only be assigned once.

17. The system for facilitating securities trading of claim 14 wherein the trader risk rating is indicative of the financial resources of and the investment experience of the trader.

18. The system for facilitating securities trading of claim 14 further comprising software executing on said computer for automatically generating and transmitting to the trader a warning regarding the proposed trade if the trader risk rating is not below a risk threshold for the proposed trade, and for automatically approving the proposed trade if an override indication is received from the trader.

* * * * *